US010983346B2

(12) United States Patent
Vallius et al.

(10) Patent No.: US 10,983,346 B2
(45) Date of Patent: Apr. 20, 2021

(54) DISPLAY APPARATUSES, SYSTEMS AND METHODS INCLUDING CURVED WAVEGUIDES

(71) Applicant: Microsoft Technology Licensing, LLC, Redmond, WA (US)

(72) Inventors: Tuomas Vallius, Espoo (FI); Adrian Travis, Paris (FR); Tero Ollikainen, Salo (FI); Dmitry Reshidko, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 673 days.

(21) Appl. No.: 15/698,456

(22) Filed: Sep. 7, 2017

(65) Prior Publication Data

US 2019/0072767 A1    Mar. 7, 2019

(51) Int. Cl.
*G03H 1/00* (2006.01)
*G02B 27/01* (2006.01)
(Continued)

(52) U.S. Cl.
CPC ....... *G02B 27/0172* (2013.01); *G02B 6/0016* (2013.01); *G02B 6/0038* (2013.01);
(Continued)

(58) Field of Classification Search
CPC ............ G02B 27/0172; G02B 27/0025; G02B 27/0081; G02B 6/0016; G02B 6/0038;
(Continued)

(56) References Cited

U.S. PATENT DOCUMENTS 8,582,209 B1    11/2013  Amirparviz
9,341,846 B2    5/2016  Popovich et al.
(Continued)

FOREIGN PATENT DOCUMENTS

CN    104656258 A    5/2015
EP    2246728 A1    11/2010
(Continued)

OTHER PUBLICATIONS

"Holographic Optical Elements (HOE)", Retrieved From: <<http://web.archive.org/web/20150712030941/http://luminitrd.com/HOE.html>>, Jul. 12, 2015, 4 Pages.
Jolly, et al., "Near-to-eye electroholography via guided-wave acousto-optics for augmented reality", In Proceedings of SPIE Practical Holography XXXI: Materials and Applications, vol. 10127, Jan. 28, 2017, 11 Pages.

*Primary Examiner* — Jade R Chwasz
*Assistant Examiner* — Jyotsna V Dabbi
(74) *Attorney, Agent, or Firm* — Alleman Hall Creasman & Tuttle LLP

(57) ABSTRACT

Apparatuses and systems including curved optical waveguides, and methods for use include an output-grating of a curved waveguide that includes a spatially modulated grating period configured to cause, for each beam of light corresponding to an image coupled into a bulk-substrate of the curved waveguide by an input-grating, corresponding rays of light output from different locations of the output-grating to be substantially collimated. Adaptive optics of a display engine compensate for aberrations that vary over a field-of-view associated with light corresponding to the image out-coupled by the output-grating. Further, a curved portion of the curved waveguide is designed to keep internally reflected light below a critical angle to prevent inadvertent out-coupling thereof. Further, curved surfaces of the curved waveguide can include polynomial surfaces to compensate for lateral color errors and distortion.

20 Claims, 12 Drawing Sheets

(51) Int. Cl.
*F21V 8/00* (2006.01)
*G02B 27/00* (2006.01)
*H04N 9/64* (2006.01)
*G02B 26/10* (2006.01)

(52) U.S. Cl.
CPC ......... *G02B 6/0045* (2013.01); *G02B 6/0076* (2013.01); *G02B 27/0025* (2013.01); *G02B 27/0081* (2013.01); *H04N 9/646* (2013.01); *G02B 6/0033* (2013.01); *G02B 26/105* (2013.01); *G02B 2027/013* (2013.01); *G02B 2027/0123* (2013.01); *G02B 2027/0174* (2013.01)

(58) Field of Classification Search
CPC .. G02B 6/0045; G02B 6/0076; G02B 6/0033; G02B 26/105; G02B 2027/0123; G02B 2027/013; G02B 2027/0174; H04N 9/646
USPC .......................................................... 359/13
See application file for complete search history.

(56) References Cited

U.S. PATENT DOCUMENTS

| | | | |
|---|---|---|---|
| 9,733,475 B1* | 8/2017 | Brown | G02B 27/0081 |
| 2010/0046219 A1 | 2/2010 | Pijlman et al. | |
| 2012/0162549 A1 | 6/2012 | Gao et al. | |
| 2013/0051730 A1 | 2/2013 | Travers et al. | |
| 2016/0195720 A1 | 7/2016 | Travis et al. | |
| 2016/0377869 A1 | 12/2016 | Lee et al. | |
| 2017/0010465 A1 | 1/2017 | Martinez et al. | |
| 2018/0211685 A1* | 7/2018 | Mehfuz | G11B 5/6088 |

FOREIGN PATENT DOCUMENTS

| | | | |
|---|---|---|---|
| WO | 2015145119 A1 | 10/2015 | |
| WO | WO-2016113533 A2 * | 7/2016 | ......... G02B 27/0103 |

* cited by examiner

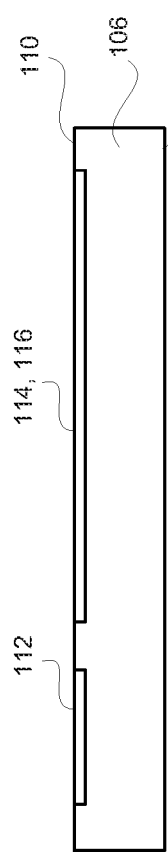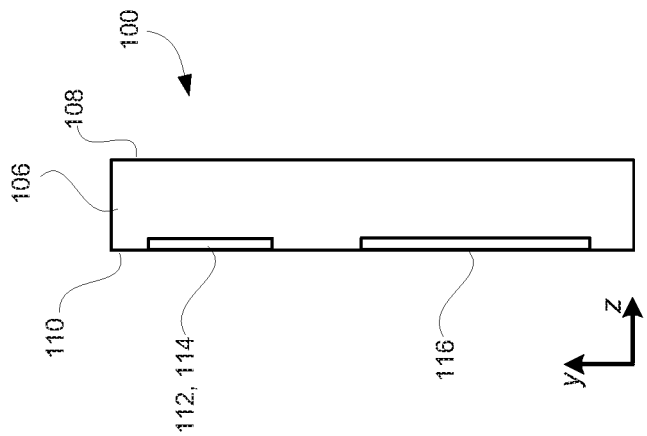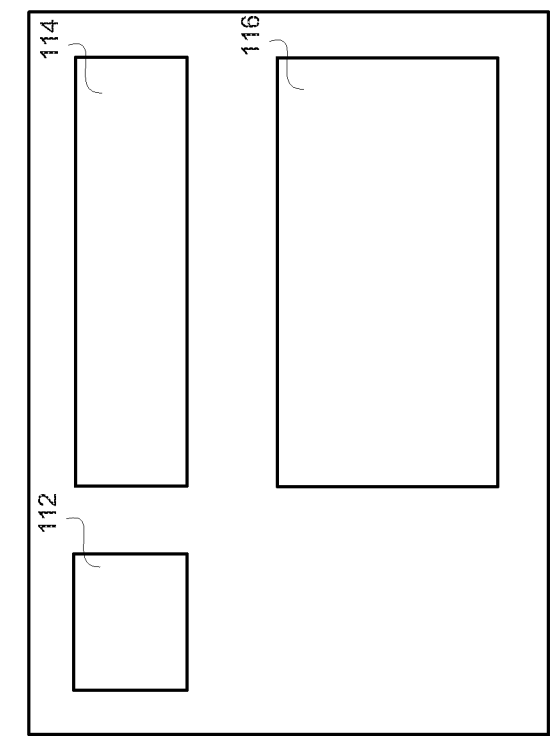

DISPLAY APPARATUSES, SYSTEMS AND METHODS INCLUDING CURVED WAVEGUIDES

BACKGROUND

Various types of computing, entertainment, and/or mobile devices can be implemented with a transparent or semi-transparent display through which a user of a device can view the surrounding environment. Such devices, which can be referred to as see-through, mixed reality display device systems, or as augmented reality (AR) systems, enable a user to see through the transparent or semi-transparent display of a device to view the surrounding environment, and also see images of virtual objects (e.g., text, graphics, video, etc.) that are generated for display to appear as a part of, and/or overlaid upon, the surrounding environment.

These devices, which can be implemented as head-mounted display (HMD) glasses or other wearable near eye display devices, or as a heads up display (HUD), but are not limited thereto, often utilize optical waveguides to replicate an image, e.g., produced by a display engine, to a location where a user of a device can view the image as a virtual image in an augmented reality environment. As this is still an emerging technology, there are certain challenges associated with utilizing a display engine and waveguides and/or other optical structures to display images of virtual objects to a user.

SUMMARY

Certain embodiments of the present technology described herein relate display apparatuses and systems including one or more curved optical waveguides, and methods for use therewith. Such a curved optical waveguide includes a bulk-substrate, an input-grating and an output-grating, and may also include one or more intermediate-components for use in pupil expansion. In accordance with certain embodiments, the output-grating of the curved optical waveguide includes a spatially modulated grating period configured to cause, for each beam of light corresponding to an image that is coupled into a bulk-substrate of the optical waveguide by an input-grating, corresponding rays of light that are output from different locations of the output-grating to be substantially collimated. An apparatus or system of the present technology can also include a display engine including adaptive optics that are controlled to compensate for aberrations that vary over a field-of-view associated with the light corresponding to the image that is out-coupled by the output-grating of the optical waveguide. Such adaptive optics can be, e.g., a deformable lens or a deformable mirror. Further, in accordance with certain embodiments a curved portion of the optical waveguide is specifically designed to keep internally reflected light below a critical angle, and thereby, to prevent inadvertent out-coupling of the light corresponding to the image before the light reaches the output-grating and distal portions thereof. Further, curved surfaces of the optical waveguide can also include polynomial surfaces to compensate for lateral color errors and distortion.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

FIGS. 1A, 1B and 1C are front, top and side views, respectively, of an exemplary planar optical waveguide that can be used to replicate an image associated with an input-pupil to an expanded output-pupil.

DETAILED DESCRIPTION

Figure 2:
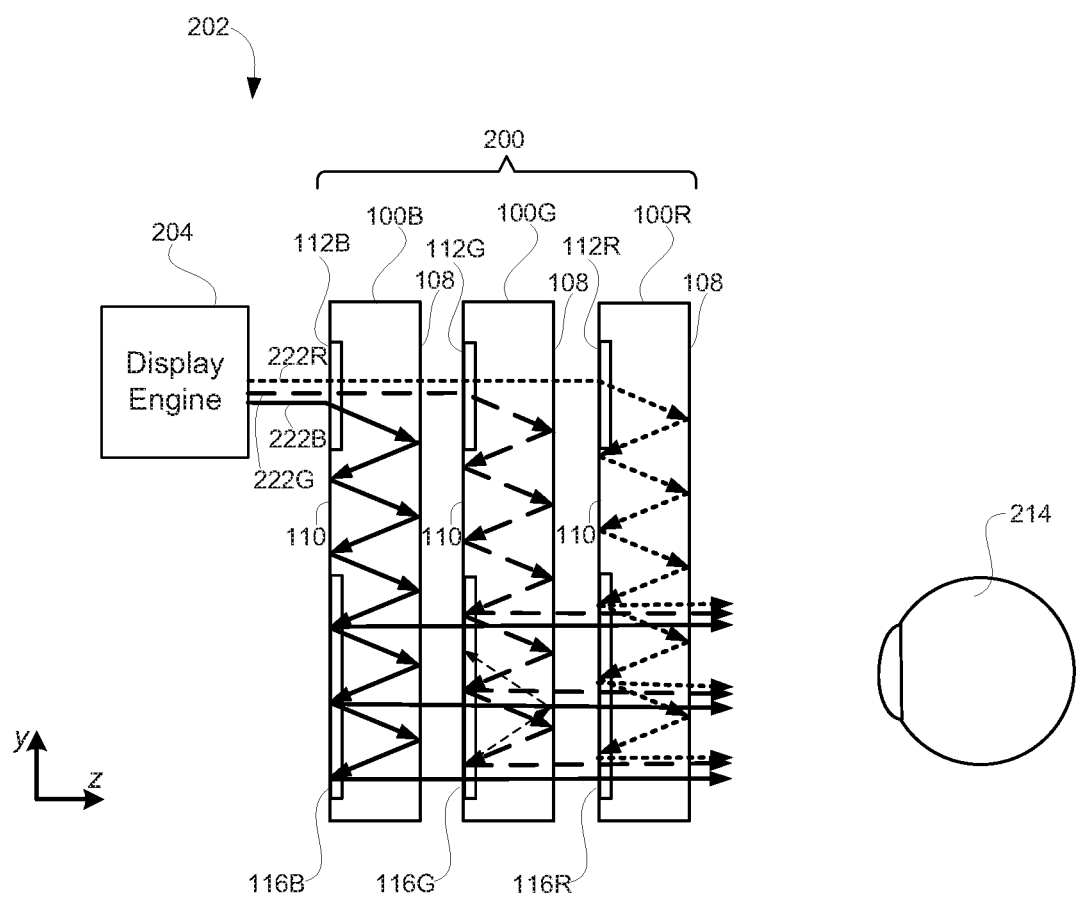
FIG. 2 is side view of the exemplary display system including a plurality of the planar optical waveguides introduced with reference to FIGS. 1A, 1B and 1C, and also shows a display engine that generates an image associated with an input-pupil and including angular content that is coupled into the waveguides by respective input-gratings, and also shows an eye that is viewing the image within an eye box that is proximate output-gratings of the waveguides.

Embodiments of the present technology relate systems, methods and apparatuses that include curved optical waveguides that each include an input-grating and an output-grating. Each of the optical waveguide(s) is configured to cause light that is coupled into the optical waveguide by the input-grating thereof, to travel at least in part by way of total internal reflection (TIR) to the output-grating thereof where the light is coupled out of the waveguide. The curved optical waveguide(s) can be components of a head-mounted display (HMD) system, some other type of near eye display system, a heads-up display (HUD) system, or some other display system. Certain embodiments of the present technology also relate to characteristics of the gratings, as well as display engines that can be used with such curved optical waveguides. However, prior to describing details of such embodiments, exemplary planar optical waveguides and exemplary display systems including such planar optical waveguides are initially described with reference to FIGS. 1 and 2. Throughout the below description, an optical waveguide may be referred to more succinctly as a waveguide.

In the description that follows, like numerals or reference designators will be used to refer to like parts or elements throughout. In addition, the first digit of a three digit reference number identifies the drawing in which the reference number first appears.

FIGS. 1A, 1B and 1C are front, top and side views, respectively, of an exemplary planar optical waveguide 100 that can be part of a waveguide assembly that is used to replicate an image associated with an input-pupil to an expanded output-pupil. The term "input-pupil," as used herein, can refer to an aperture through which light corresponding to an image is overlaid on one or more input-gratings of one or more waveguides. The term "output-pupil," as used herein, can refer to an aperture through which light corresponding to an image exits one or more output-gratings of one or more waveguides. The term "output-pupil" can also be used refer to an aperture through which light corresponding to an image exits a display engine, examples of which are described below. More generally, the term "pupil" is used to refer to an aperture through which a light corresponding to an image travels. The planar optical waveguide 100 will often be referred to hereafter more succinctly simply as a planar waveguide 100, or even more succinctly as a waveguide 100. As will be discussed in further detail below with reference to FIG. 2, the image that the waveguide 100 is being used to replicate, and likely also expand, can be generated using a display engine.

Referring to FIGS. 1A, 1B and 1C, the planar optical waveguide 100 includes a bulk-substrate 106 having an input-grating 112 and an output-grating 116. The input-grating 112 is configured to couple light corresponding to an image associated with an input-pupil into the bulk-substrate 106 of the waveguide. The light corresponding to an image, before it is in-coupled into an optical waveguide by an input-grating, can also be referred to as an input-pupil of image bearing light. The output-grating 116 is configured to couple the light corresponding to the image associated with the input-pupil, which travels in the optical waveguide 100 from the input-grating 112 to the output-grating 116, out of the waveguide 100 so that the light is output and imaged from the output-pupil associated with the waveguide. More generally, the image can be viewed within an eye-box that is proximate the output-grating, wherein the eye-box is dependent on an exit pupil size and an eye relief distance. The size of the eye-box can be, e.g., 20 mm wide by 10 mm high, but is not limited thereto.

The bulk-substrate 106, which can be made of glass or optical plastic, but is not limited thereto, includes a first major planar surface 108 and a second major planar surface 110 opposite and parallel to the first major planar surface 108. The first major planar surface 108 can alternatively be referred to as the front-side major surface 108 (or more simply the front-side surface 108), and the second major planar surface 110 can alternatively be referred to as the back-side major surface 110 (or more simply the back-side surface 110). As the term "bulk" is used herein, a substrate is considered to be "bulk" substrate where the thickness of the substrate (between its major surfaces) is at least ten times (i.e., 10×) the wavelength of the light for which the substrate is being used as an optical transmission medium. For an example, where the light (for which the substrate is being used as an optical transmission medium) is red light having a wavelength of 620 nm, the substrate will be considered a bulk-substrate where the thickness of the substrate (between its major surfaces) is at least 6200 nm, i.e., at least 6.2 µm. In accordance with certain embodiments, the bulk-substrate 106 has a thickness of at least 25 µm between its major planar surfaces 108 and 110. In specific embodiments, the bulk-substrate 106 has a thickness (between its major surfaces) within a range of 25 µm to 1000 µm. The bulk-substrate 106, and more generally the waveguide 100, is transparent, meaning that it allows light to pass through it so that a user can see through the waveguide 100 and observe objects on an opposite side of the waveguide 100 than the user's eye(s).

The optical waveguide 100 in FIGS. 1A, 1B and 1C is also shown as including an intermediate-component 114, which can alternatively be referred to as an intermediate-zone 114. Where the waveguide 100 includes the intermediate-component 114, the input-grating 112 is configured to couple light into the waveguide 100 (and more specifically, into the bulk-substrate 106 of the waveguide 100) and in a direction of the intermediate-component 114. The intermediate-component 114 is configured to redirect such light in a direction of the output-grating 116. Further, the intermediate-component 114 is configured to perform one of horizontal or vertical pupil expansion, and the output-grating 116 is configured to perform the other one of horizontal or vertical pupil expansion. For example, the intermediate-component 114 can be configured to perform horizontal pupil expansion, and the output-grating 116 can be configured to vertical pupil expansion. Alternatively, if the intermediate-component 114 were repositioned, e.g., to be below the input-grating 112 and to the left of the output-grating 116 shown in FIG. 1A, then the intermediate-component 114 can be configured to perform vertical pupil expansion, and the output-grating 116 can be configured to perform horizontal pupil expansion. Such pupil expansion provides for an increased eye box, compared to if pupil expansion were not performed, thereby making the embodiments described herein practical for use in a near eye or heads up display. In certain embodiments, the intermediate-component is configured as a fold-grating. In other embodiments, the intermediate-component is a mirror based component, rather than a grating based component.

The input-grating 112, the intermediate-component 114 and the output-grating 116 can be referred to collectively herein as optical components 112, 114 and 116 of the waveguide, or more succinctly as components 112, 114 and 116. It is possible that a waveguide includes an input-grating and an output-grating, without including an intermediate-component. In such embodiments, the input-grating would be configured to couple light into the waveguide and in a direction toward the output-grating. In such embodiments, the output-grating can provide one of horizontal or vertical pupil expansion, depending upon implementation.

In FIG. 1A, the input-grating 112, the intermediate-component 114 and the output-grating 116 are shown as having rectangular outer peripheral shapes, but can have alternative outer peripheral shapes. For example, the input-grating 112 can alternatively have a circular outer peripheral shape, but is not limited thereto. For another example, the intermediate-component can have a triangular or hexagonal outer peripheral shape, but is not limited thereto. Further, it is noted that the corners of each of the peripheral shapes, e.g., where generally rectangular or triangular, can be chamfered or rounded, but are not limited thereto. These are just a few exemplary outer peripheral shapes for the input-grating 112, the intermediate-component 114 and the output-grating 116, which are not intended to be all encompassing. It is also possible that an optical waveguide includes multiple intermediate-components.

As can best be appreciated from FIGS. 1B and 1C, the input-grating 112, the intermediate-component 114 and the output-grating 116 are all shown as being provided in or on a same surface (i.e., the back-side surface 110) of the waveguide 100. In such a case, the input-grating 112 can be transmissive (e.g., a transmission grating), the intermediate-component 114 can be reflective (e.g., a reflective grating), and the output-grating 116 can also be reflective (e.g., a further reflective grating). The input-grating 112, the intermediate-component 114 and the output-grating 116 can alternatively all be provided in the front-side surface 110 of the waveguide 100. In such a case, the input-grating 112 can be reflective (e.g., a reflective grating), the intermediate-component 114 can be reflective (e.g., a further reflective grating), and the output-grating 116 can also be transmissive (e.g., a transmission grating).

Alternatively, the input-grating 112, the intermediate-component 114 and the output-grating 116 can all be embedded (also referred to as immersed) in the bulk-substrate 106. For example, the bulk-substrate 106 can be separated into two halves (that are parallel to the major surfaces 108 and 110), and the input-grating 112, the intermediate-component 114 and the output-grating 116 can be provided in (e.g., etched into) one of the inner surfaces of the two halves, and the inner surfaces of the two halves can be adhered to one another. Alternatively, the bulk-substrate 106 can be separated into two halves (that are parallel to the major surfaces 108 and 110), and the input-grating 112, the intermediate-component 114 and the output-grating 116 can be provided between the inner surfaces of the two halves. Other implementations for embedding the input-grating 112, the intermediate-component 114 and the output-grating 116 in the bulk-substrate 106 are also possible, and within the scope of the embodiments described herein. It is also possible that one of the input-grating 112, the intermediate-component 114 and the output-grating 116 is provided in or on the front-side surface 108 of the waveguide 100, another one of the components 112, 114 and 116 is provided in or on the back-side surface 110, and the last one of the components 112, 114 and 116 is embedded or immersed in the bulk-substrate 106. More generally, unless stated otherwise, any individual one of the input-grating 112, the intermediate-component 114 and the output-grating 116 can be provided in or on either one of the major planar surfaces 108 or 110 of the bulk-substrate 106, or embedded therebetween. It is also possible that one or more of the input-grating 112, the intermediate-component 114 and the output-grating 116 is provided in or on both the front-side surface 108 of the waveguide 100 and the back-side surface 110 of the waveguide 100.

The input-grating 112, the intermediate-component 114 and the output-grating 116 can each be implemented as a diffraction grating, or more generally, as a diffractive optical element (DOE). Such DOEs can be produced using holographic processes, in which case, the DOEs can be more specifically referred to a holographic optical elements (HOEs). The intermediate-component 114, as noted above, can be implemented using a fold-grating, or can alternatively be implemented as a mirror based pupil expander, but is not limited thereto. Where the input-grating 112 is a diffraction grating, it can be referred to more specifically as an input diffraction grating 112. Where the intermediate-component 114 is a diffraction grating, it can be referred to more specifically as an intermediate diffraction grating 114. Similarly, where the output-grating 116 is a diffraction grating, it can be referred to more specifically as an output diffraction grating 116.

A diffraction grating is an optical component that may contain a periodic structure that causes incident light to split and change direction due to an optical phenomenon known as diffraction. The splitting (known as optical orders) and angle change depend on the characteristics of the diffraction grating. When the periodic structure is on a surface of an optical component, it is referred to a surface grating. When the periodic structure is due to varying of the surface itself, it is referred to as a surface relief grating (SRG). For example, an SRG can include uniform straight grooves in a surface of an optical component that are separated by uniform straight groove spacing regions. Groove spacing regions can be referred to as "lines", "grating lines" or "filling regions". The nature of the diffraction by an SRG depends on the wavelength, polarization and angle of light incident on the SRG and various optical characteristics of the SRG, such as refractive index, line spacing, groove depth, groove profile, groove fill ratio and groove slant angle. An SRG can be fabricated by way of a suitable microfabrication process, which may involve etching of and/or deposition on a substrate to fabricate a desired periodic microstructure on the substrate to form an optical component, which may then be used as a production master such as a mold or mask for manufacturing further optical components. An SRG is an example of a Diffractive Optical Element (DOE). When a DOE is present on a surface (e.g. when the DOE is an SRG), the portion of that surface spanned by that DOE can be referred to as a DOE area. A diffraction grating, instead of being a surface grating, can alternatively be a volume grating, such as a Bragg diffraction grating. It is also possible that one or more of the couplers are manufactured as SRGs and then covered within another material, e.g., using an aluminum deposition process, thereby essentially burying the SRGs such that the major planar waveguide surface(s) including the SRG(s) is/are substantially smooth. Such a coupler is one example of a hybrid of a surface and volume diffraction grating. Any one of the input-grating 112, the intermediate-component 114 and the output-grating 116 can be, e.g., a surface diffraction grating, or a volume diffraction grating, or a hybrid of a surface and volume diffraction grating. Each diffraction grating can have a preferential linear polarization orientation specified by a direction of the grating lines of the diffraction grating, wherein the coupling efficiency for light having the preferential linear polarization orientation will be higher than for light having a non-preferential linear polarization orientation.

Where the input-grating 112, the intermediate-component 114 and/or the output-grating 116 is an SRG, each such SRG can be etched into one of the major planar surfaces 108 or 110 of the bulk-substrate 106. In such embodiments, the SRG can be said to be formed "in" the bulk-substrate 106. Alternatively, each SRG can be physically formed in a coating that covers one of the major planar surfaces 108 or 110 of the bulk-substrate 106, in which case each such SRG can be said to be formed "on" the bulk-substrate 106. Either way, the components 112, 114 and 116 are considered parts of the waveguide 100.

Referring specifically to FIG. 1A, in an exemplary embodiment, the input-grating 112 can have surface gratings that extend in a vertical (y) direction, the output-grating 116 can have surface gratings that extend in a horizontal (x) direction, and the intermediate-component 114 can have surface gratings that extend diagonal (e.g., ~45 degrees) relative to the horizontal and vertical directions. This is just an example. Other variations are also possible and within the scope of embodiments of the present technology.

More generally, the input-grating 112, the intermediate-component 114 and the output-grating 116 can have various different outer peripheral geometries, can be provided in or on either of the major planar surfaces of the bulk-substrate, or can be embedded in the bulk-substrate 106, and can be implemented using various different types of optical structures, as can be appreciated from the above discussion, and will further be appreciated from the discussion below.

In general, light corresponding to an image, which is coupled into the waveguide via the input-grating 112, can travel through the waveguide from the input-grating 112 to the output-grating 116, by way of total internal refection (TIR). TIR is a phenomenon which occurs when a propagating light wave strikes a medium boundary (e.g., of the bulk-substrate 106) at an angle larger than the critical angle with respect to the normal to the surface. In other words, the critical angle ($\theta_c$) is the angle of incidence above which TIR occurs, which is given by Snell's Law, as is known in the art. More specifically, Snell's law specifies that the critical angle ($\theta_c$) is specified using the following equation:

$$\theta_c = \sin^{-1}(n2/n1)$$

where $\theta_c$ the critical angle for two optical mediums (e.g., the bulk-substrate 106, and air or some other medium that is adjacent to the bulk-substrate 106) that meet at a medium boundary, n1 is the index of refraction of the optical medium in which light is traveling towards the medium boundary (e.g., the bulk-substrate 106, once the light is couple therein), and n2 is the index of refraction of the optical medium beyond the medium boundary (e.g., air or some other medium adjacent to the bulk-substrate 106).

The concept of light traveling through the waveguide 100, from the input-grating 112 to the output-grating 116, by way of TIR, can be better appreciated from FIG. 2, which is discussed below.

Referring to FIG. 2, a side view of an exemplary display system 202 is shown therein. The display system 202 is shown as including three planar waveguides labeled 100R, 100G, 100B (each of which can be similar to the waveguide 100 introduced with reference to FIGS. 1A, 1B and 1C) and a display engine 204 that generates an image including angular content that is coupled into the waveguides 100R, 100G and 100B by the input-gratings 112R, 112G and 112B. FIG. 2 also shows a human eye 214 that is viewing the image (as a virtual image) within an eye box that is proximate the output-gratings 116R, 116G and 116B. Explained another way, the human eye 214 is viewing the image from an output-pupil associated with the waveguides 100R, 100G and 100B. The display system 202 can be, e.g., a near eye display (NED) or a heads up display (HUD) system, but is not limited thereto.

The planar optical waveguides 100R, 100G and 100B can be configured, respectively, to transfer red, green and blue light corresponding to an image from an input-pupil to an output-pupil. More specifically, an input-grating 112R of the waveguide 100R can be configured to couple light (corresponding to the image) within a red wavelength range into the waveguide 100R, and the output-grating 116R of the waveguide 100R can be configured to couple light (corresponding to the image) within the red wavelength range (which has travelled from the input-grating 112R to the output-grating 116R by way of TIR) out of the waveguide 100R. Similarly, an input-grating 112G of the waveguide 100G can be configured to couple light (corresponding to the image) within a green wavelength range into the waveguide 100G, and the output-grating 116G of the waveguide 100G can be configured to couple light (corresponding to the image) within the green wavelength range (which has travelled from the input-grating 112G to the output-grating 116G by way of TIR) out of the waveguide 100G. Further, an input-grating 112B of the waveguide 100B can be configured to couple light (corresponding to the image) within a blue wavelength range into the waveguide 100B, and the output-grating 116B of the waveguide 100B can be configured to couple light (corresponding to the image) within the blue wavelength range (which has travelled from the input-grating 112B to the output-grating 116B by way of TIR) out of the waveguide 100B. In accordance with an embodiment, the red wavelength range is from 600 nm to 650 nm, the green wavelength range is from 500 nm to 550 nm, and the blue wavelength range is from 430 nm to 480 nn. Other wavelength ranges are also possible.

When implemented as an input diffraction grating, the input-grating 112B is designed to diffract blue light within an input angular range (e.g., +/−15 degrees relative to the normal) and within the blue wavelength range (e.g., from 430 nm to 480 nn) into the waveguide 100B, such that an angle of the diffractively in-coupled blue light exceeds the critical angle for the waveguide 100B and can thereby travel by way of TIR from the input-grating 112B to the output-grating 116B. Further, the input-grating 112B is designed to transmit light outside the blue wavelength range, so that light outside the blue wavelength range (such as light within the green and red wavelength ranges) will pass through the waveguide 100B.

When implemented as an input diffraction grating, the input-grating 112G is designed to diffract green light within an input angular range (e.g., +/−15 degrees relative to the normal) and within the green wavelength range (e.g., from 500 nm to 550 nm) into the waveguide 100G, such that an angle of the diffractively in-coupled green light exceeds the critical angle for the waveguide 100G and can thereby travel by way of TIR from the input-grating 112G to the output-grating 116G. Further, the input-grating 112G is designed to transmit light outside the green wavelength range, so that light outside the green wavelength range (such as light within the red wavelength range) will pass through the waveguide 100G.

When implemented as an input diffraction grating, the input-grating 112R is designed to diffract red light within an input angular range (e.g., +/−15 degrees relative to the normal) and within the red wavelength range (e.g., from 600 nm to 650 nm) into the waveguide 100R, such that an angle of the diffractively in-coupled red light exceeds the critical angle for the waveguide 100R and can thereby travel by way of TIR from the input-grating 112R to the output-grating 116R. Further, the input-grating 112R is designed to transmit light outside the red wavelength range, so that light outside the red wavelength range will pass through the waveguide 100R.

More generally, each of the waveguides 100 can include an input-grating 112 that is configured to couple-in light within an input angular range (e.g., +/−15 degrees relative to the normal) and within a specific wavelength range into the waveguide, such that an angle of the in-coupled light exceeds the critical angle for the waveguide 100 and can thereby travel by way of TIR from the input-grating 112 to the output-grating 116 of the waveguide 100, and such that light outside the specific wavelength range is transmitted and passes through the waveguide 100.

The optical waveguides 100R, 100G and 100B can be referred to collectively as the waveguides 100, or individually as a waveguide 100. Two or more of the waveguides 100 can be referred to as a waveguide assembly 200. More specifically, multiple waveguides 100 can be stacked, back-to-back, to provide the waveguide assembly 200. The distance between adjacent waveguides 100 of the waveguide assembly 200 can be, e.g., between approximately 50 micrometers (μm) and 300 μm, but is not limited thereto. While not specifically shown, spacers can be located between adjacent waveguides 100 to maintain a desired spacing therebetween. The input-gratings 112G, 112R and 112B can be referred to collectively as the input-gratings 112, or individually as an input-grating 112. Similarly, the output-gratings 116G, 116R and 116B can be referred to collectively as the output-gratings 116, or individually as an output-grating 116. While the waveguide assembly 200 is shown as including three waveguides 100, it is also possible that a waveguide assembly include more or less than three waveguides, as will be described in additional detail below.

Each of the input-gratings 112 have an input angular range, and each of the output-grating 116 have an output angular range. In accordance with certain embodiments, all of the input-gratings 112 have substantially the same input angular range, and all of the output-gratings 116 have substantially the same output angular range. In accordance with certain embodiments, the input angular range for the input-gratings 112 is substantially the same as the output angular range for the output-gratings 116. Values are considered to be substantially the same if they are within 5% of one another. In accordance with certain embodiments, the input angular range and the output angular range are each approximately +/−15 degrees relative to the normal. Smaller or larger input and output angular ranges are also possible, and within the scope of embodiments described herein.

In FIG. 2, the dotted arrowed line 222R is representative of red (R) light corresponding to an image that is output by the display engine 204, the dashed arrowed line 222G is representative of green (G) light corresponding to the image that is output by the display engine 204, and the solid arrowed line 222B is representative of blue (B) light corresponding to the image that is output by the display engine 204. While the R, G and B light (222R, 222G and 22B) is shown as being spatially offset from one another, this is likely not the case, but rather, FIG. 2 was drawn in this manner so that the R, G and B light can be separately represented. More likely, the R, G and B light (222R, 222G and 22B) that exits the display engine 204 would completely overlap one another. Further, while the waveguides 100R, 100G and 100B are shown as being stacked in a specific order, the order in which the waveguides 100 are stacked can be changed.

The display engine 204 can include, e.g., an imaging device (also known as an image former), an imaging lens and a light source assembly (also known as an illuminator, or simply as a light source), but is not limited thereto. The imaging device of the display engine 204 can be implemented using a liquid crystal on silicon (LCOS) display, which is a type of reflective technology for which external light is reflected and modulated by an optically active material. Where the imaging device is an LCOS display, the light source assembly would likely include red, green and blue light emitting diodes (LEDs). However, a disadvantage of using an LCOS display to implement the display engine it that the resulting display engine is larger and heavier than desired, e.g., due to the polarizing beam splitter cubes that are typically used in an LCOS display. It would be desirable for the volume of the display engine 204 to be no larger than 25 mm×12 mm×12 mm, and no heavier than about 25 grams. However, where the imaging device is implemented as an LCOS display, and the light source assembly is implemented using LEDs, it has proved difficult to make the display engine 204 any smaller than about 50 mm×50 mm×25 mm, and it has proved difficult to make the display engine any lighter than about 70 grams. Further, in order to reduce power consumption, it would be desirable to use laser diodes (LDs) in place of LEDs within the light source assembly, since LDs are more power efficient than LEDs. The imaging device of the display engine 204 can alternatively be implemented using a scanning mirror subsystem, an example of which is described below with reference to FIG. 3.

In FIG. 2, the display engine 204 is shown as facing the back-side surface 110 of the waveguides 100, and the eye 214 is shown as facing the front-side surfaces 108 opposite and parallel to the back-side surfaces 110. This provides for a periscope type of configuration in which light enters the waveguide on one side of the waveguides 100, and exits the waveguide at an opposite side of the waveguides 100. Alternatively, the input-gratings 112 and the output-gratings 116 can be implemented in a manner such that the display engine 204 and the eye 214 are proximate to and face a same major planar surface (108 or 110).

The waveguide assembly 200 can be incorporated into a see-through mixed reality display device system, but is not limited to use therewith. A separate instance of the waveguide assembly 200 and the display engine 204 can be provided for each of the left and right eyes of a user. In certain embodiments, such waveguide assemblies 200 may be positioned next to or between see-through lenses, which may be standard lenses used in eye glasses and can be made to any prescription (including no prescription). Where a see-through mixed reality display device system is implemented as head-mounted display (HMD) glasses including a frame, the display engine 204 can be located to the side of the frame so that it sits near to a user's temple. Alternatively, the display engine 204 can be located in a central portion of the HMD glasses that rests above a nose bridge of a user. Other locations for the display engine 204 are also possible. In these instances, the user can also be referred to as a wearer. Where there is a separate waveguide assembly for each of the left and right eyes of a user, there can be a separate display engine for each of the waveguide assemblies, and thus, for each of the left and right eyes of the user. One or more further adjacent waveguides can be used to perform eye tracking based on infrared light that is incident on and reflected from the user's eye(s) 214, as is known in the art.

Figure 3:
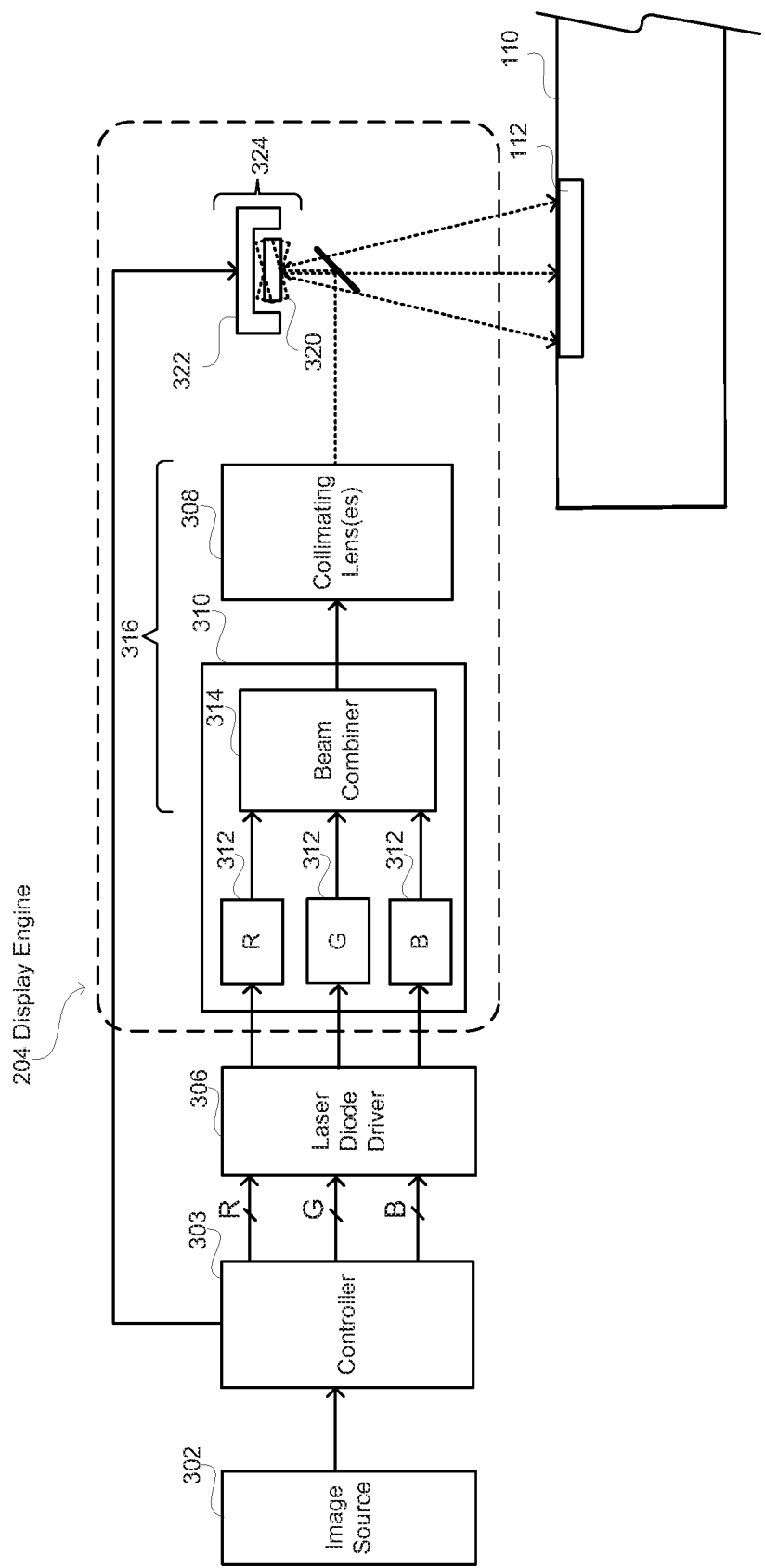
FIG. 3 illustrates exemplary details of the display engine introduced with reference to FIG. 2.

One way to reduce the size, weight and power consumption of the display engine 204 is to implement the imaging device (also known as an image former) using scanning mirror display technology, instead of LCOS display technology, and implement the light source assembly using LDs, instead of LEDs. The scanning mirror subsystem described below with reference to FIG. 3 is an example of an imaging device that uses scanning mirror display technology. One or more of the mirror(s) of such a subsystem can be MEMS (Microelectromechanical systems) mirror(s), but are not limited thereto.

FIG. 3 illustrates exemplary details of the display engine 204, according to an exemplary embodiment. The display engine 204 is shown as including a light source assembly 310, one or more collimating lens(es) 308, and one or more scanning mirror(s) 320. The light source assembly 310 is shown as include red (R), green (G) and blue (B) laser diodes (LDs) 312, and a beam combiner 314. Also shown in FIG. 3 is an image source 302, a controller 303 and a laser diode driver (LDD) 306, any one or all of which can be considered to be external to the display engine 204, or can be implemented as part of the display engine 204, depending upon implementation.

In FIG. 3, the image source 302, the controller 303 and the LDD 306 are shown as being outside the dashed block labeled 204, and thus, are shown as being outside the display engine 204. Alternatively, one or more of the image source 302, the controller 303 and/or the LDD 306 can be considered part of the display engine 204, as this would just be a matter of nomenclature.

The controller 303, which can be implemented using an application specific integrated circuit (ASIC) and/or a micro-controller, but is not limited thereto, is shown as receiving an image signal from the image source 302. The controller 303 can receive, e.g., red (R), green (G) and blue (B) pixel data, a horizontal synchronization (Hsync) signal, and a vertical synchronization (Vsync) signal from the image source 302. The Hsync signal can include one pulse per horizontal line of a frame, which indicates the end of one line and the beginning of the next line. The Vsync signal can include one pulse per frame, which indicates the end of one frame and the beginning of the next frame.

The controller 303 can perform gamma correction, color space conversion, interpolation, decimation, and/or the like. The controller 303 can also produce drive signals and control signals for producing an image including angular content that is coupled into one or more waveguides 100 by one or more input-gratings 112. More specifically, the controller 303 is shown as providing R, G and B digital drive signals to the LDD 306, which converts such digital signals to analog R, G and B drive signals which are used to drive R, G and B laser diodes (LDs) 312, thereby causing the LDs 312 to selectively emit R, G and B laser beams.

The beam combiner 314 can include dichroic filters, and/or other beam combiner optics, to combine the red, green and blue laser beams (produced by red, green and blue LDs 312) into a single laser beam, which can also be referred to as a light beam, that is provided to the one or more collimating lens(es) 308. The collimating lens(es) 308 collimate the light beam output by the beam combiner 314, and the collimated light beam is provided to the one or more MEMS scanning mirrors 320. The beam combiner 314 and the collimating lens(es) 308 are collectively an example of an optical subsystem 316 that is configured to combine and collimate the light emitted by a plurality of light emitting elements (e.g., the R, G and B LDs 312) into a single beam of light. Alternatively optical subsystems can be used to combine and collimate the light emitted by a plurality of light emitting elements into a single beam of light, as would be known to one of ordinary skill in the art.

The controller 303 can also produce a fast axis control signal and a slow axis control signal that are used to control the scanning mirror(s) 320. The fast axis control signal is sometimes referred to as a horizontal (H) control signal, and the slow axis control signal is sometimes referred to as a vertical (V) control signal. The fast and slow axis control signals, also known as the H and V control signals, that are produced by the controller 303 and used to control the scanning mirror(s) 320 may be provided to a mirror drive unit and/or scanning platform (represented by element 322) that changes the position of the mirror(s) in response to the H and V control signals. The scanning mirror(s) 320 and the mirror drive unit and/or scanning platform (represented by element 322) can be collectively referred to as a scanning mirror subsystem 324.

The scanning mirror(s) 320, which can be controlled by the controller 303, can raster-scan reflected light onto an input-pupil associated with the input-grating 112. In other words, the collimating lens(es) 308 and the scanning mirror(s) 320 project and form a pupil at the location of the input-grating(s) 112 of the waveguide(s) 100. In accordance with an embodiment, an input-pupil associated with the waveguide may be approximately the same size as an output-pupil associated with the display engine 204, e.g., 5 mm or less in some embodiments, but is not limited thereto. The scanning mirror(s) 320 can be implemented, for example, using a single scanning mirror (which is often referred to as a biaxial scanning mirror) or using two uniaxial scanning mirrors, one or both of which can be MEMS mirrors, but are not limited thereto. A feedback signal can be provided from the scanning mirror(s) 320 to the controller 303 to provide real time position information to the controller 303. It would also be possible to separate the controller 303 into two or more functional blocks or circuits, one of which performs video or other image processing and provides RGB data to the LDD 306, and another (e.g., a scan controller, or more generally a controller) which controls the scanning mirror(s) 320. While not shown in FIG. 3, it is also possible that a display engine includes relay optics, such as one or more relay lenses to extend or invert images as appropriate.

A field-of-view (FOV) specifies the full cone of angles supported by a camera that captures an image or by a display that displays an image. Any specific angle is defined as a "field angle" and it corresponds to a certain point in a scene at a certain viewing distance. To provide for a realistic and immersive experience for wearers of an HMD, it is desirable to provide for a wide FOV, which can be characterized in terms of its horizontal, vertical and diagonal components. For example, where there is a desire to include virtual images within a peripheral view of the wearer of an HMD, the horizontal width of the optics (such as an optical waveguide) needs to be increased. However, when using planar waveguides, a horizontal FOV of about 50 degrees is the upper limit of feasibility, since to achieve a greater horizontal FOV would require that the planar waveguides extend beyond the outer dimensions of a user's head, which would be impractical. In other words, it would not be practical to provide for a horizontal FOV beyond about 50 degrees using planar waveguides, because the form factor of such an HMD would be bulky, impractical and unacceptable to most users.

Curved Optical Waveguides and Problems Associated Therewith

One potential way to increase the horizontal FOV of a display system including optical waveguides would be to use curved optical waveguides in place of planar optical waveguides, wherein the curved waveguides may generally resemble lenses of curved sunglasses (also known as wrap around sunglasses). However, using curved waveguides to replicate an input-pupil to an output-pupil has generally been considered impossible for a number of reasons, which are discussed below.

When light travels by way of TIR within a curved waveguide, the propagation angle of light changes every time the light hits a curved surface. Accordingly, after a few bounces, angles of a majority of the light may fall below the critical angle and be inadvertently out-coupled from the curved waveguide before reaching the output-grating thereof. This would result in hardly any of the light reaching distal portions of the output-grating which are intended to enable the user (also referred to as the wearer) to view images within the user's peripheral view. A further problem with using curved waveguides is that even if the light makes it to the output-grating of the waveguide, the output angles of rays of light (corresponding to the same beam of light incident on the input-grating) from different locations along the output-grating would not match one another, resulting in a spectrum, which will blur the image and/or cause double imaging. Still another problem with using curved waveguides is that reflections by curved surfaces create aberrations, such that when pupils are replicated within curved waveguides, wavefronts are severely distorted and cannot be focused into spots anymore. Such aberrations vary over a FOV associated with the light corresponding to the image that is out-coupled by the output-grating of the optical waveguide. In other words, such aberrations are different for each different field-angle (which can also be referred to as a field-of-view angle), and therefore, are difficult to correct. However, without correcting for the aberrations, image quality is destroyed. Also, because different wavelengths undergo different errors in the propagation direction when hitting a curved surface of a curved waveguide, this causes excessive lateral color errors and distortion in an image viewed from an eye-box.

The types of aberrations that are of most concern include spherical aberrations, defocus, coma, and astigmatism. Spherical aberrations result in light rays reflecting off different portions of a curved surface deviating from their expected or proper course, which results in imperfections in the produced image. Defocus is an aberration that results in the produced image being out of focus (i.e., having a reduced sharpness and contrast), and more specifically, refers to a translation along an optical axis away from the plane or surface of best focus. Coma, which can also be referred to as comatic aberration, refers to an aberration inherent to certain optical designs or due to imperfections in optical components that results in off-axis point sources appearing distorted and/or appearing to have a tail (coma) like a comet. More specifically, coma is defined as a variation in magnification over the entrance pupil. In refractive or diffractive optical systems, such as an optical system including one or more waveguides having gratings, coma can be a function of wavelength, in which case it is a form of chromatic aberration. Astigmatism is an aberration where rays that propagate in two perpendicular planes have different foci. There are two distinct forms of astigmatism. One type of astigmatism is third-order aberration, also referred to as monochromatic aberration, which occurs for objects (or parts of objects) away from the optical axis. The other type of astigmatism occurs when an optical system is not symmetric about the optical axis. This may be by design (as in the case of a cylindrical lens), or due to manufacturing error in the surfaces of the components or misalignment of the components.

Embodiments of the present technology, which are described below, can be used to overcome the above summarized problems associated with using curved optical waveguides. Solutions to each of the above summarized problems are discussed below, one at a time.

Compensation for Changes in Propagation Angles

Figure 4:
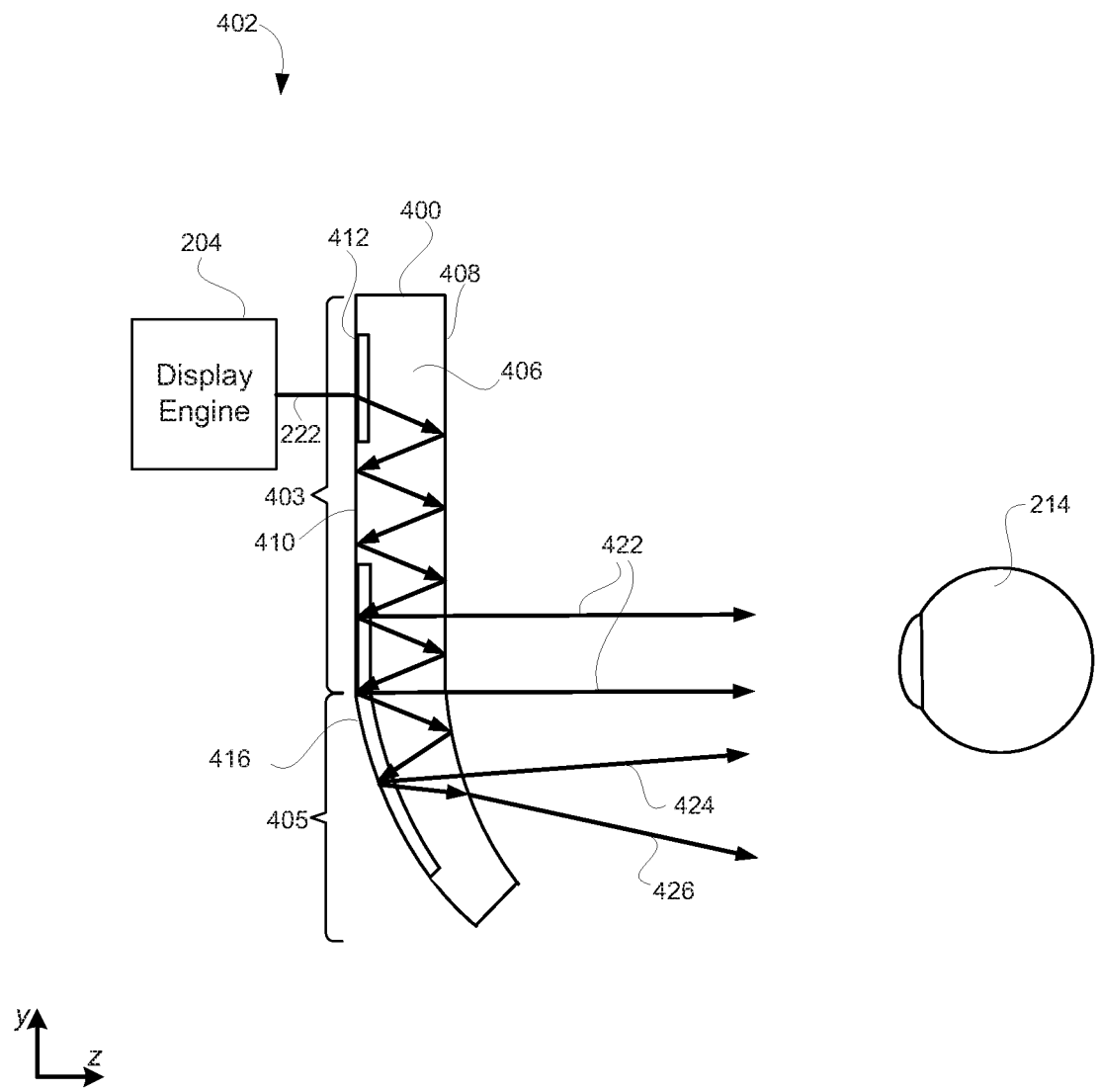
FIG. 4, which illustrates a display system including an exemplary curved optical waveguide, is used to explain various potential problems associated with using a curved optical waveguide.

With respect to a planar optical waveguide, such as the exemplary planar optical waveguide 100 described above with reference to FIGS. 1A, 1B and 1C, the first and second major surfaces 108 and 110 are planar surfaces that are opposite and parallel to one another. The horizontal FOV that can be effectively achieved in an HMD or other near eye display system using planar optical waveguides is limited to about 50 degrees, as explained above. In accordance with certain embodiments of the present technology, in order to increase the horizontal FOV beyond 50 degrees (e.g., up to about 70 degrees, and potentially up to a large as 120 degrees), curved optical waveguides are used in place of planar optical waveguides. As the term curved optical waveguide is used herein, the entire waveguide need not be curved. Rather, a first portion of the waveguide may be planer, while a second portion of the waveguide is curved, e.g., as shown in FIG. 4. In other words, at least a portion of a curved waveguide is curved, while another portion of the curved waveguide may (or may not) be planar.

Referring to FIG. 4, shown therein is a display system 402 including an exemplary curved optical waveguide 400, which includes both a planar portion 403 and a curved portion 405. More specifically, the curved optical waveguide 400 includes a bulk-substrate 406 having an input-grating 412 and an output-grating 416. The curved optical waveguide 400 may also include one or more intermediate-component(s), which may be similar to the intermediate-component 114 described above with references to FIGS. 1A, 1B and 1C. Such an intermediate-component can be configured to perform one of horizontal or vertical pupil expansion, and the output-grating 416 can be configured to perform the other one of horizontal or vertical pupil expansion. The bulk-substrate 406, which can be made of glass or optical plastic, but is not limited thereto, includes a first major surface 408 and a second major surface 410, each of which includes a planar portion and a curved portion. While only one curved optical waveguide 400 is shown in FIG. 4 for simplicity, the display system 402 may include three curved waveguides, as was the case in FIG. 2 (one of which is for use in in-coupling, propagating, and out-coupling red (R) light; one of which is for use in in-coupling, propagating, and out-coupling green (G) light; and one of which is for use in in-coupling, propagating, and out-coupling blue (B) light, by appropriate design of their gratings). It would also be possible for the display system 402 to include some other number of curved optical waveguides.

As explained above, one potential problem with using a curved optical waveguide, such as the curved waveguide 400, is that when light travels by way of TIR within a curved waveguide, the propagation angle of light rays changes every time the light hits a curved surface. If the curved waveguide is not designed appropriately, this will result in at least some of the internally reflected light being incident on a major surface of the waveguide at an angle of incidence that is below the critical angle, and thus, being inadvertently out-coupled from the optical waveguide. The effect of this inadvertent out-coupling of light is that hardly any of the light (if any) would reach distal portions of the output-grating (e.g., 416 in FIG. 4) that are intended to enable a user to view images within the user's peripheral view. In FIG. 4, the light rays labeled 422 are representative of light rays (corresponding to a same light beam incident on the input-grating 412) that are appropriately out-coupled by a portion of the output-grating 416 that is located within the planar portion 403 of the curved optical waveguide 400. More specifically, the light rays labeled 422 are diffractively out-coupled at different locations of the the output-grating 416 at substantially the same angle such that they are substantially collimated. By contrast, the light ray labeled 426 is representative of light that is inadvertently out-coupled from the optical waveguide 400 because the light ray is incident on the curved portion of the major surface 408 of the optical waveguide 400 at an angle of incidence that is below the critical angle. The inadvertent out-coupling can additionally and/or alternatively occur from the opposing major surface 410. Also shown in FIG. 4 is a light ray labeled 424 that is representative of light that is diffractively out-coupled (by a portion of the output-grating 416 within the curved portion 405 of the optical waveguide 400) at a different angle than the rays labeled 422, and thus, could cause a ghost image.

Overcoming Inadvertent Out-Coupling Problem

Figure 5A:
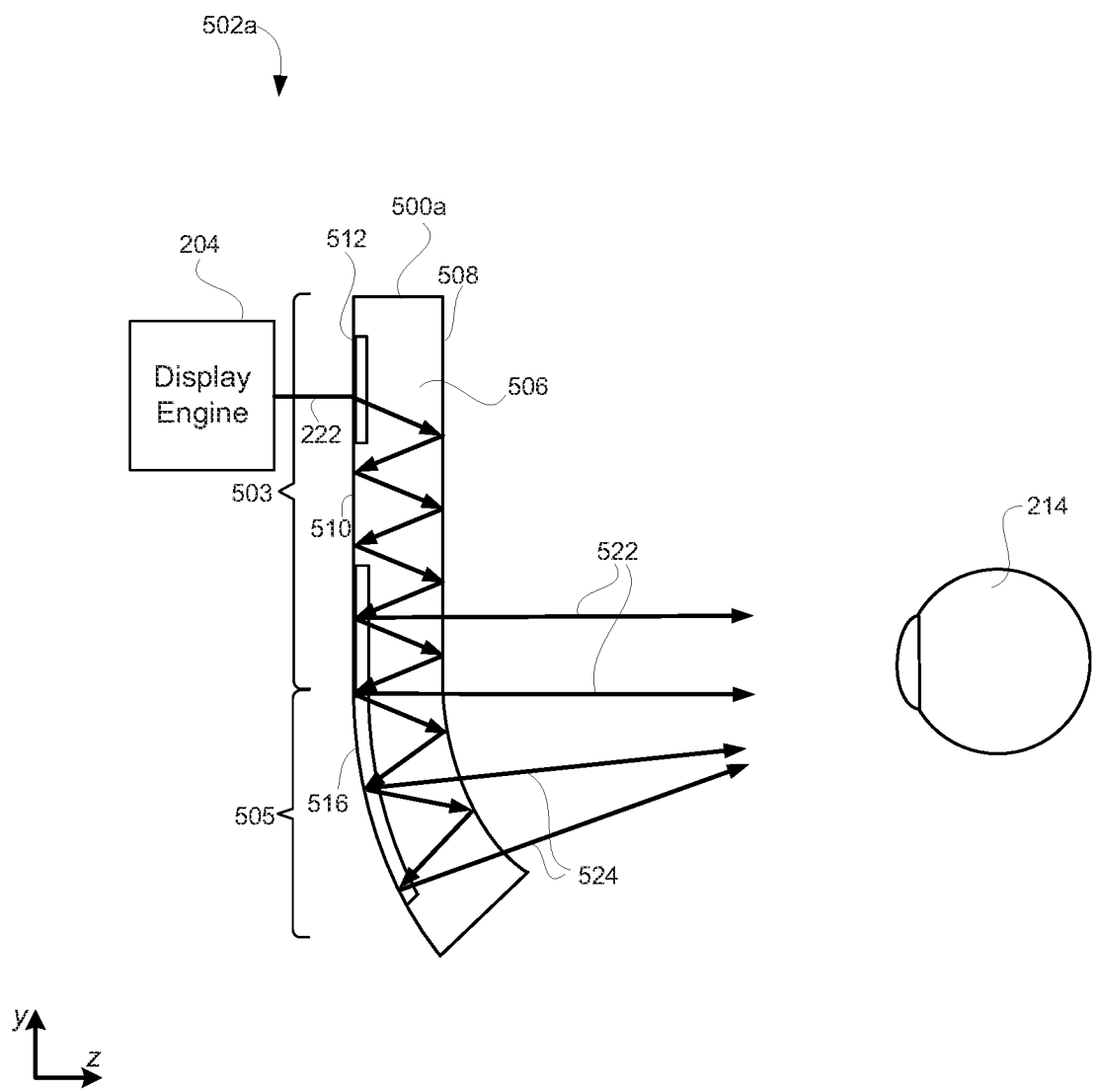
FIG. 5A illustrates a display system including a curved optical waveguide, according to an embodiment of the present technology, wherein the curved optical waveguide includes a curved portion having a thickness that increases in a direction that light propagates.
Figure 5B:
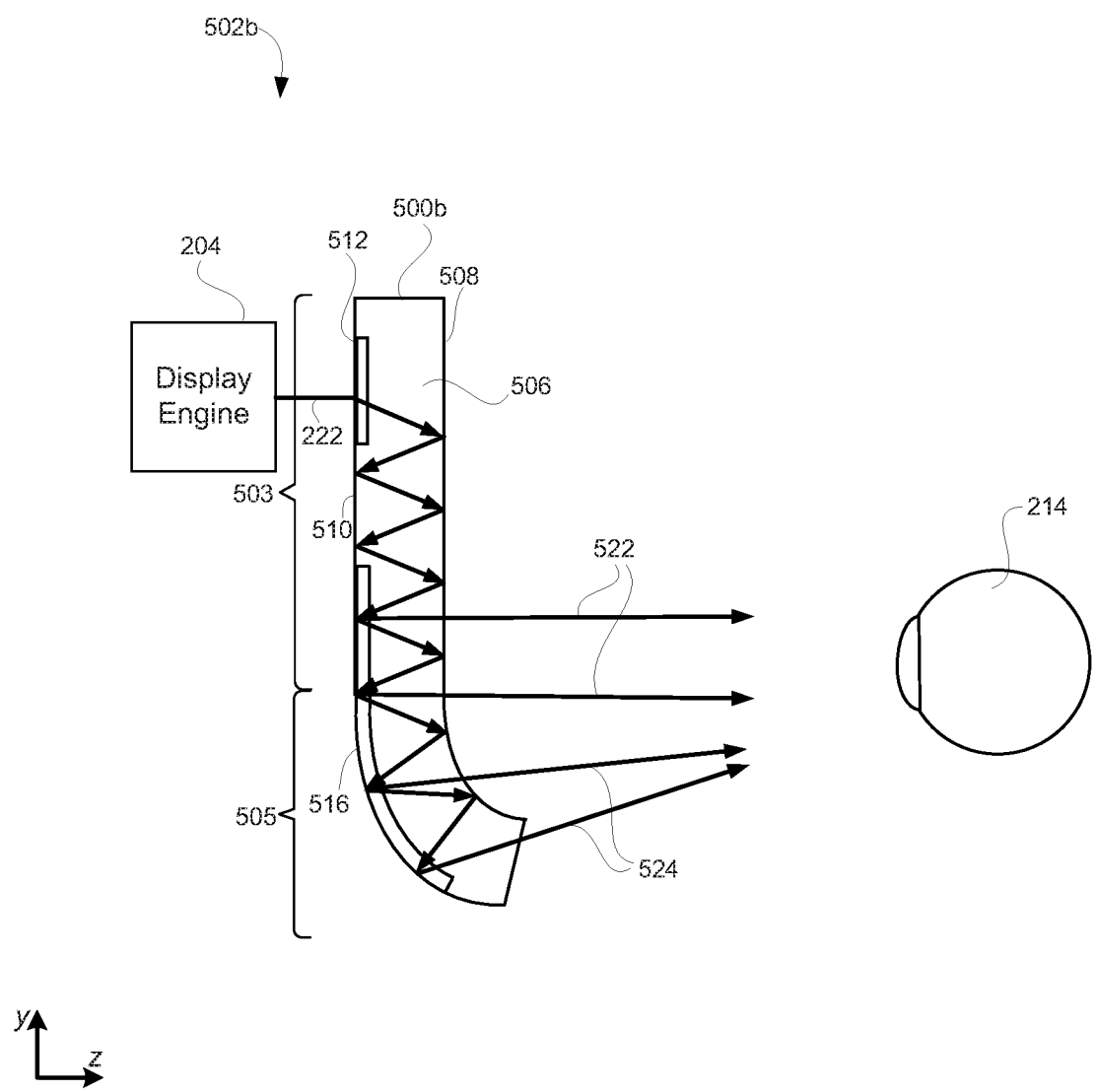
FIG. 5B illustrates a display system including a curved optical waveguide, according to an embodiment of the present technology, wherein a curved portion of the optical waveguide is implemented as a portion of a Cornu spiral.

In accordance with embodiments of the present technology, there are three different options or embodiments for overcoming the above described inadvertent out-coupling problem that would be caused if light was incident on a major surface of a curved optical waveguide below the critical angle of the waveguide. These include increasing thickness embodiments, Cornu spiral embodiments, and concentric circle arc embodiments, each of which are described below respectively with reference to FIGS. 5A, 5B and 5C. In the embodiments of FIGS. 5A and 5B, changes in the propagation angles that are caused by internal reflections off one of the first and second major surfaces of a curved portion of an optical waveguide are compensated for by the other one of the first and second major surfaces, to ensure that angles of light rays do not fall below the critical angle. In these embodiments, the compensation is performed such that for any combination of angle of incidence and location at which light is incident on a curved surface, the light is reflected at a predictable angle that will cause the light to be incident on the opposing curved surface above the critical angle of the waveguide.

In accordance with certain embodiments, in order to ensure that propagation angles of at least a majority of the light corresponding to an image that propagates through a curved portion of an optical waveguide do not fall below a critical angle of the optical waveguide, and thus, is not out-coupled before reaching distal portions of the output-grating, the thickness of the curved portion of the optical waveguide increases in a direction that light propagates (within the optical waveguide towards the output-grating) such that changes in the propagation angles that are caused by internal reflections off one of the first and second major surfaces are compensated for by the other one of the first and second major surfaces. Explained another way, a thickness, between portions of the first and second major surfaces that correspond to the portion of the optical waveguide that is curved, increases in a direction that light propagates longitudinal within the optical waveguide towards the output-grating such that changes in the propagation angles that are caused by internal reflections off one of the first and second major surfaces are compensated for by the other one of the first and second major surfaces. An example of such an increasing thickness embodiment is shown in FIG. 5A.

Referring to FIG. 5A, shown therein is display system 502a including an exemplary curved optical waveguide 500a, which includes both a planar portion 503 and a curved portion 505. More specifically, the curved optical waveguide 500a includes a bulk-substrate 506 having an input-grating 512 and an output-grating 516. The curved optical waveguide 500a may also include one or more intermediate-component, similar to the intermediate-component 114 described above with references to FIGS. 1A, 1B and 1C. Such an intermediate-component(s) can perform one of horizontal or vertical pupil expansion, and the output-grating 516 can perform the other one of horizontal or vertical pupil expansion. The bulk-substrate 506, which can be made of glass or optical plastic, but is not limited thereto, includes a first major surface 508 and a second major surface 510, each of which includes a planar portion and a curved portion. As can be seen in FIG. 5A, the thickness of the curved portion 505 of the optical waveguide 500a increases in a longitudinal direction that light propagates (within the optical waveguide 500a towards the output-grating 516). This gradual increase in the thickness is selected such that changes in the propagation angles that are caused by internal reflections off one of the first and second major surfaces 508 and 510 are compensated for by the other one of the first and second major surfaces 508 and 510. In other words, the thickness between portions of the first and second major surfaces 508 and 510 that corresponding to the curved portion 505 of the optical waveguide 500 increases in a longitudinal direction that light propagates within the optical waveguide 500a towards the output-grating 516 such that changes in the propagation angles that are caused by internal reflections off one of the first and second major surfaces 508 and 510 are compensated for by the other one of the first and second major surfaces 508 and 510.

In alternative embodiments, in order to ensure that propagation angles of at least a majority of the light corresponding to an image that propagates through a curved portion of an optical waveguide does not fall below a critical angle of the optical waveguide, and thus, is not out-coupled before reaching distal portion of the output-grating, the portion of the optical waveguide that is curved is implemented as a portion of a Cornu spiral. A Cornu spiral is a curve that changes linearly with its curve length. Accordingly, in such embodiments, the portion of the optical waveguide that is curved has a curvature that changes linearly with its curve length to form a portion of a Cornu spiral, which is also known as a Euler spiral, a spiro curve, and a clothoid curve. The equation for a Cornu spiral, which is known as the Cesáro equation, is $\rho = c^2/s$, where $\rho$ (pronounced "rho") is the radius of curvature, s is the arc length, and c is a constant selected to achieve a desired form factor. An example of such a Cornu spiral embodiment is shown in FIG. 5B.

Referring to FIG. 5B, shown therein is a display system 502b including an exemplary curved optical waveguide 500b, which includes both a planar portion 503 and a curved portion 505. Reference numbers that are the same in FIG. 5B as they are in FIG. 5A are used to represent the same or similar elements. In FIG. 5B, the curved portion 505 of the optical waveguide has the curvature of a portion of a Cornu spiral. In this embodiment, changes in the propagation angles that are caused by internal reflections off one of the first and second major surfaces 508 and 510 are compensated for by the other one of the first and second major surfaces 508 and 510.

The thickness of curved portion 505 of the optical waveguide 500b that is implemented as a portion of a Cornu spiral can remain constant and be the same as the thickness of the planar portion 503 of the optical waveguide 500b, as shown in FIG. 5B. Alternatively, the thickness of a curved portion of an optical waveguide that is implemented as a portion of a Cornu spiral can gradually increase, so as to implement a combination of the increasing thickness and Cornu spiral embodiments.

In still other embodiments, in order to ensure that propagation angles of at least a majority of the light corresponding to an image that propagates through a portion of an optical waveguide that is curved does not fall below a critical angle of the optical waveguide, and thus, is not out-coupled before reaching distal portion of the output-grating, portions of the first and second major surfaces of the optical waveguide (that corresponding to the curved portion of the optical waveguide) are, respectively, first and second arcs of first and second concentric circles. In such embodiments, the thickness of curved portion of an optical waveguide remains constant. More specifically, in such embodiments, the difference in the radiuses of the first and second concentric circles is equal to the thickness of the curved portion of the optical waveguide, which is the same as the thickness of the planar portion of the optical waveguide. Accordingly, if a particular radius is selected for one of the major surfaces of the curved portion of the waveguide (e.g., to provide a desired form factor), then the radius of the other major surface of the curved portion of the waveguide can be determined using the equation r2−r1=t, where r1 and r2 are, respectively, the radiuses of the first and second major surface of the curved portion of the optical waveguide, and t is the thickness of the planar portion of the optical waveguide (which as noted above, is the same as the thickness of the curved portion of the optical waveguide). An example of such a concentric circle arc embodiment is shown in FIG. 5C.

Figure 5C:
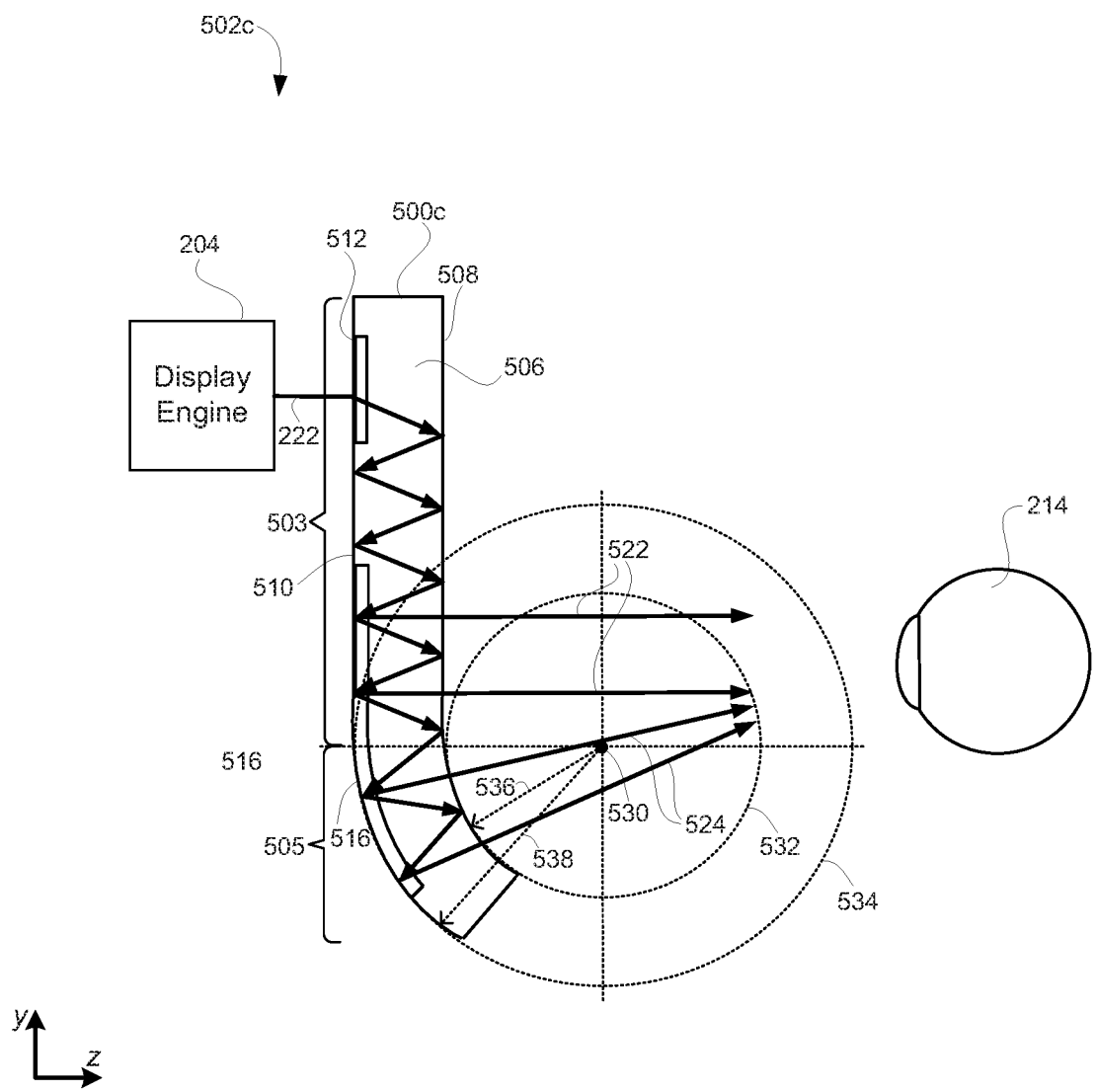
FIG. 5C illustrates a display system including a curved optical waveguide, according to an embodiment of the present technology, wherein portions of the opposing major surfaces corresponding to the curved portion of the optical waveguide are arcs of concentric circles.

Referring to FIG. 5C, shown therein is a display system 502c including an exemplary curved optical waveguide 500c, which includes both a planar portion 503 and a curved portion 505. Reference numbers that are the same in FIG. 5C as they are in FIGS. 5A and 5B are used to represent the same or similar elements. In FIG. 5C, the portions of the major surfaces 508 and 510 that correspond to the curved portion 505 of the optical waveguide 500c are arcs of concentric circles. The concentric circles are represented by the dotted line circles 532 and 534, with the arrowed dotted line 538 being the radius r2 of the circle 534, the arrowed dotted line 536 being the radius r1 of the circle 532, and the dot labeled 530 being the common center of the concentric circles 532 and 534.

In the embodiments of FIGS. 5A and 5B the angle at which a ray of light travels longitudinally through the waveguide may change in a predictable manner with each reflection off of a curved surface. By contrast, in the embodiment of FIG. 5C, the angle at which a ray of light travels longitudinally through the waveguide will remain the same due to the curved surfaces being arcs of concentric circles.

Software that simulates the propagation of light through an optomechanical system by raytracing can be used to design the various types of curved waveguides described above. An example of such software is the FRED Optical Engineering Software™ available from Photon Engineering, LLC, headquartered in Tucson, Ariz., USA. Other off the shelf or custom software can alternatively be used.

Correcting for Lateral Color Errors, Distortion and Double Imaging

Lateral color errors and distortion can result from different wavelengths of light propagating at different angles within a curved optical waveguide undergoing different errors in a propagation direction when reflecting off of a curved surface of the curved optical waveguide. In accordance with certain embodiments of the present technology, the portions of the major surfaces 508 and 510 that corresponding to the curved portion of the curved optical waveguide 500a, 500b or 500c are not only curved (in one of the manners described above with reference to FIGS. 5A, 5B and 5C), they are also polynomial surfaces (e.g., polynomial aspheric surfaces) that compensate for lateral color errors and distortion that would otherwise result (from different wavelengths of light propagating at different angles within the optical waveguide undergoing different errors in a propagation direction when reflecting off of a curved surface of the curved optical waveguide). Software that simulates the propagation of light through an optomechanical system by raytracing can be used to design the polynomial surfaces described above. An example of such software is the FRED Optical Engineering Software™ available from Photon Engineering, LLC, headquartered in Tucson, Ariz., USA. Other off the shelf or custom software can alternatively be used.

The characteristic (of a curved portion of an optical waveguide) that prevents inadvertent out-coupling of light that would otherwise occur if internally reflected light exceeds the critical angle, can be referred to as the primary or overall characteristic of the curve, or the primary or overall curve characteristic. In other words, the curved portion of the waveguide having an increasing thickness, being a portion of a Cornu spiral, or being made up of arcs of concentric circles, are examples of primary or overall characteristics of the curved portion of the waveguide. The characteristic that the curved portion of the optical waveguide includes polynomial surfaces (e.g., polynomial aspheric surfaces) can be referred to as a secondary characteristic.

As noted above, further problem with using curved waveguides is that for a beam of light corresponding to an image (that is coupled into the bulk-substrate of the optical waveguide by the input-grating) that makes it to the output-grating of the waveguide, rays of light that are output from different locations of the output grating may not be collimated, resulting in a spectrum, which will blur the image and/or cause double imaging. Examples of this problem were discussed above with reference to FIGS. 4, 5A, 5B and 5C.

Referring again to FIG. 4, the light rays labeled 422 are representative of rays of light (corresponding to a beam incident on the input-grating 412) that are diffractively out-coupled at different locations along the output-grating 416 such that they are substantially parallel to one another. In other words, the light rays labeled 422 are substantially collimated. By contrast, the light ray labeled 424 is not substantially parallel to the light rays labeled 422, and thus, could cause a ghost image. In FIGS. 5A, 5B and 5C, the light rays labeled 524 are similarly representative of light that is diffractively out-coupled (by a portion of the output-grating 516 within the curved portion 505 of the optical waveguides 500a, 500b or 500c) at a different angles (than other rays corresponding to the same beam) that can cause ghost images.

In accordance with certain embodiments of the present technology, the output-grating (e.g., 516) of a curved optical waveguide (e.g., 500a, 500b or 500c) has a varying grating period (also referred to herein as a spatially modulated grating period) that is configured to cause, for each beam of light corresponding to an image that is coupled into the bulk-substrate of the optical waveguide by the input-grating, corresponding rays of light that are output from different locations of the output-grating to be substantially collimated. Substantially collimated, as the term is used herein, means that the light rays travel at angles that are within one degree of one another. Preferably, the substantially collimated light includes light rays that travel at angles that are less than 0.5 degrees of one another, and more preferably less than 0.2 degrees of one another. Exemplary details of such embodiments are described with reference to FIG. 6.

Figure 6:
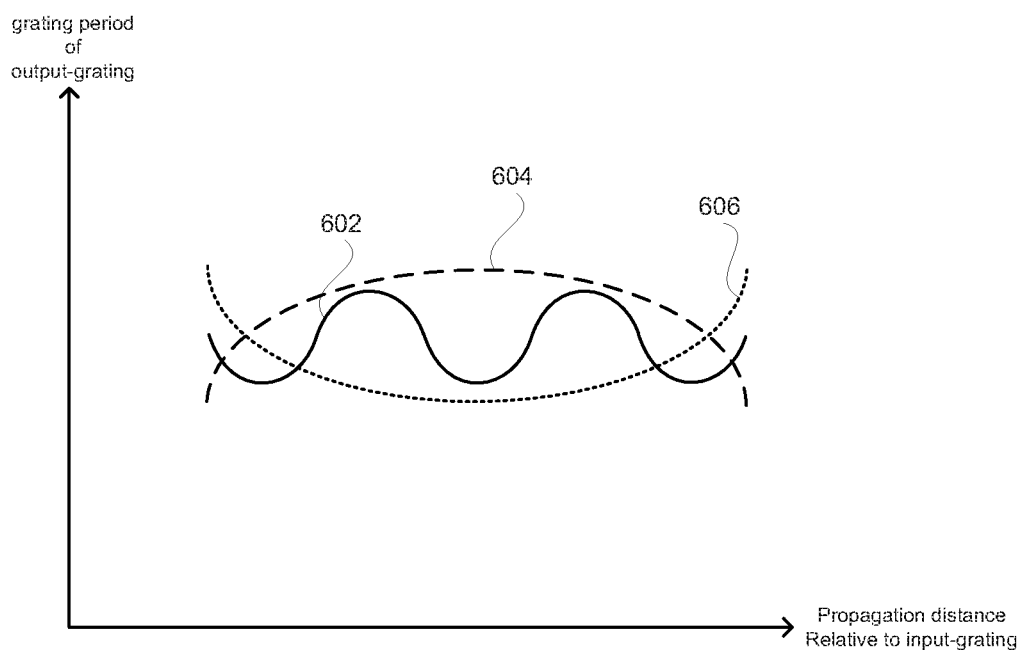
FIG. 6 shows graphs of three different exemplary polynomial functions corresponding to exemplary spatially modulated grating periods of an output-grating of a curved optical waveguide configured to cause, for each beam of light corresponding to the image that is coupled into a bulk-substrate of the curved optical waveguide by an input-grating, corresponding rays of light that are output from different locations of the output-grating to be substantially collimated.
Figure 7:
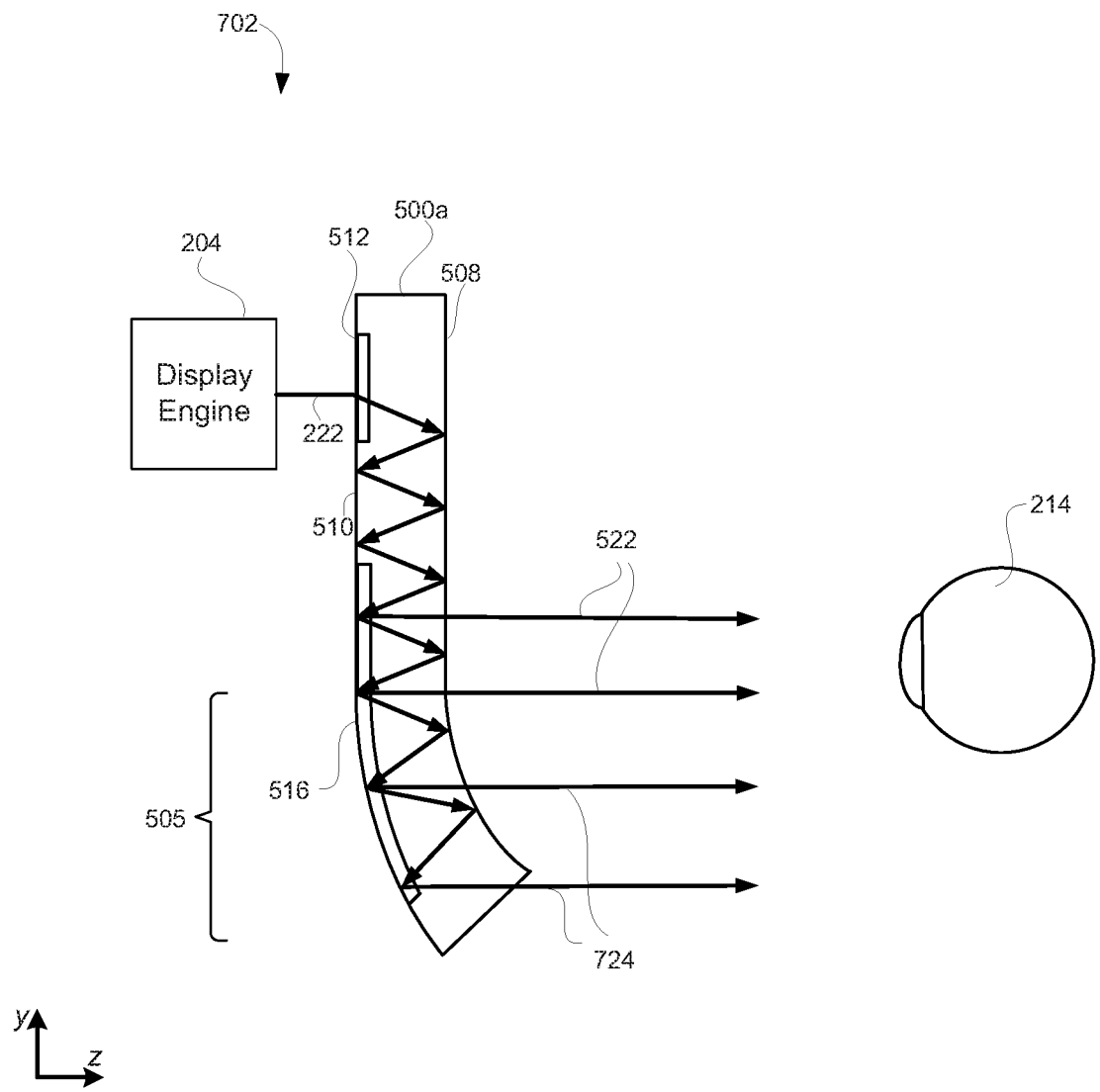
FIG. 7 is similar to FIG. 5A, but shows how an appropriately spatially modulated grating period of an output-grating of a curved optical waveguide can cause corresponding rays of light that are output from different locations of an output-grating to be substantially collimated.

Referring to FIG. 6, shown therein are graphs of three different polynomial functions labeled 602, 604 and 606, wherein the horizontal axis (i.e., x-axis) of the graph corresponds to a propagation distance relative to an input-grating (e.g., 512 in FIG. 5A, 5B or 5C), and the vertical axis (i.e., the y-axis) of the graph corresponds to the grating period of the output-grating (e.g., 516 in FIG. 5A, 5B or 5C). As can be appreciated from FIG. 6, there is more than one polynomial function that can be used to define the varying grating period of an output-grating (e.g., 516 in FIG. 5A, 5B or 5C) of a curved optical waveguide (e.g., 500a, 500b or 500c). As can also be appreciated from FIG. 6, the distance between groves is changing at different grating positions according to the polynomial function. Referring briefly back to FIGS. 5A, 5B and 5C, if the output-grating 516 in each of these FIGS. were implemented using an appropriately selected spatially modulated grating period, the light rays labeled 524 would be substantially parallel to the light rays labeled 522 (i.e., within one degree of one another, preferably within 0.5 degrees of one another, and more preferably within 0.2 degrees of one another), because the light rays labeled 524 would represent the output angles of rays of light (corresponding to the same beam of light incident on the input-grating) from different locations along the output-grating 516 that substantially match one another, beneficially avoiding a spectrum and beneficially avoiding double imaging. FIG. 7, which is similar to FIG. 5A, shows a display system 702 wherein the diffractively out-coupled light rays 724 (which had been labeled 524 in FIG. 5A) are substantially parallel to the light rays labeled 522, by designing the output-grating 516 to have an appropriate varying (also referred to as spatially modulated) grating period.

The polynomial function that defines a varying grating period of an output-grating (e.g., 516) of a curved optical waveguide (e.g., 500a, 500b or 500c) can be a $2^{nd}$ order polynomial function, a $3^{rd}$ order polynomial function, or a $4^{th}$ order polynomial function, but is not limited thereto. For an example, where portions of the first and second major surfaces corresponding to a curved portion of an optical waveguide are respectively first and second arcs of first and second concentric circles, an exemplary polynomial function that defines the varying grating period of the output-grating (e.g., 516) is the quadratic polynomial function $f=-a*x^2$, where a is a positive coefficient. In such an embodiment, the angle of incidence at the opposing surfaces stays the same, but the surface curves inward, requiring that rays of light bend less as they propagate further along the curved waveguide, necessitating smaller spacing for grating lines (i.e., higherfrequency) in the center and more sparse spacing (lower frequency) at the edge. Such polynomial functions can be determined using off the shelf or custom software. Examples of the off the shelf software that may be useful for determining the varying grating period, or more specifically the polynomial function that defines the varying grating period, include, but are not limited to: FRED Optical Engineering Software™ available from Photon Engineering, LLC, headquartered in Tucson, Ariz., USA; and OpticStudio™ software available from Zemax, LLC, headquartered in Kirkland, Wash.

Correcting for Aberrations that Differ for Different Field Angles

As noted above, another problem with using curved waveguides is that reflections by curved surfaces create aberrations, such that when pupils are replicated within curved waveguides, wavefronts are severely distorted and cannot be focused into spots anymore. Such aberrations are different for each different filed angle (which can also be referred to as a field-of-view angle), and therefore are difficult to correct. However, without correcting for the aberrations, image quality is destroyed. As noted above, the types of aberrations that are of most concern include spherical aberrations, defocus, coma, and astigmatism.

In the past, there have been attempts to design grating periods to correct for aberrations. However, at best a properly designed grating period can only correct for aberrations for a single finite wavelength (e.g., of about 0.1 nm), a single incident angle and a single spot within a FOV. Accordingly, this is not a solution that would be useful in a HMD or other type of display system that is for use in displaying multicolor images over a wide FOV. Further, as noted above, the output-grating of a curved optical waveguide is already being spatially modulated to cause, for each beam of light corresponding to the image that is coupled into bulk-substrate of optical waveguide by input-grating, corresponding rays of light that are output from different locations of the output-grating to be substantially collimated.

In accordance with certain embodiments of the present technology, adaptive optics are included within a display engine of a display system that produces light corresponding to an image, and the adaptive optics are controlled to compensate for aberrations that vary over a FOV associated with the light corresponding to the image that is out-coupled by an output-grating (e.g., 516) of a curved optical waveguide (e.g., 500a, 500b or 500c). The aberrations that are compensated for by the adaptive optics of the display engine include at least one of spherical aberrations, defocus, coma, or astigmatism, and preferably all of these types of aberrations. The adaptive optics of the display engine can include one or more adaptive optical elements, each of which can be a deformable mirror or a deformable lens.

Figure 8A:
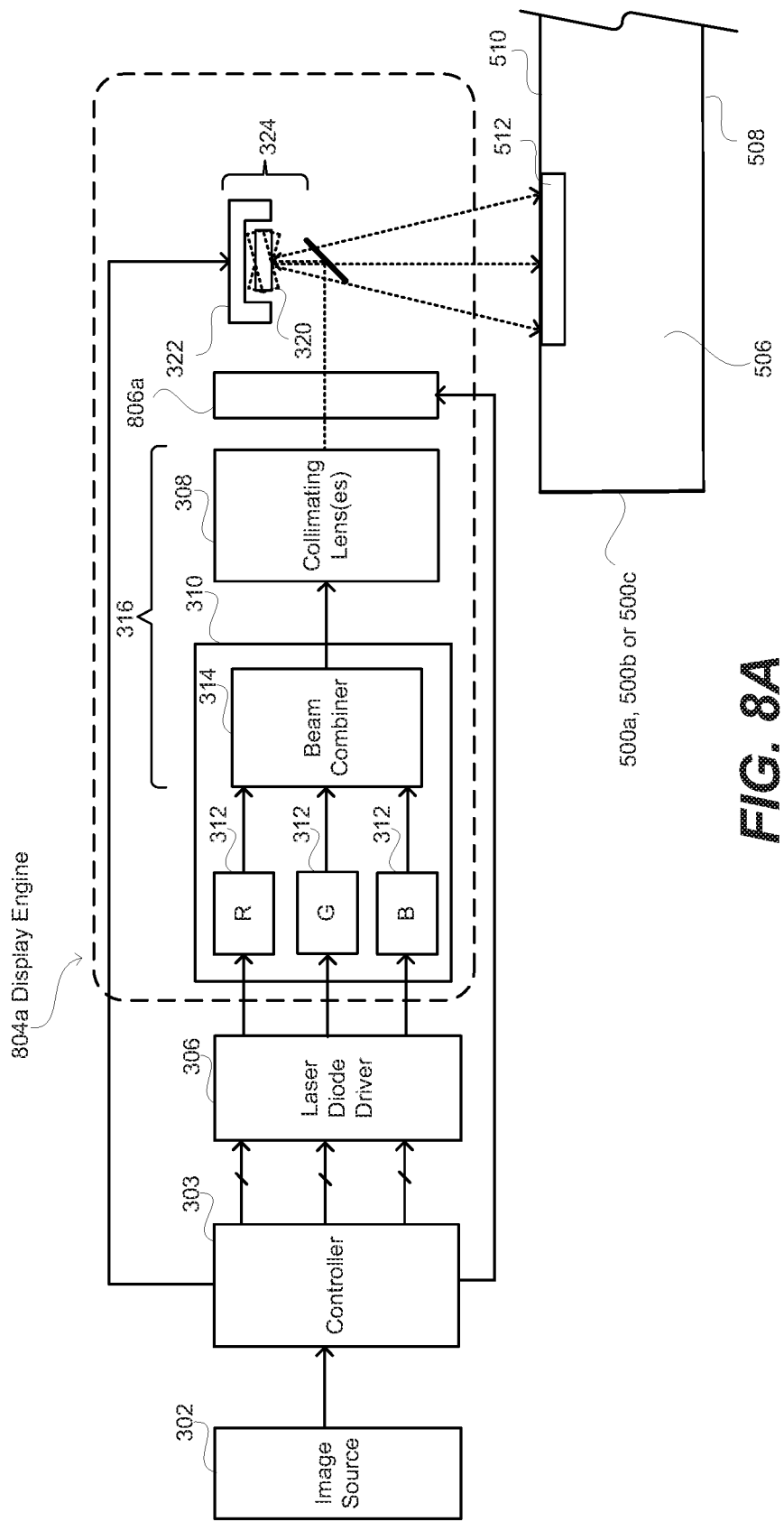
FIGS. 8A and 8B illustrate exemplary display engines that include adaptive optics that are controlled to compensate for aberrations that vary over a field-of-view (FOV) associated with light corresponding to an image that is out-coupled by an output-grating of a curved optical waveguide.
Figure 8B:
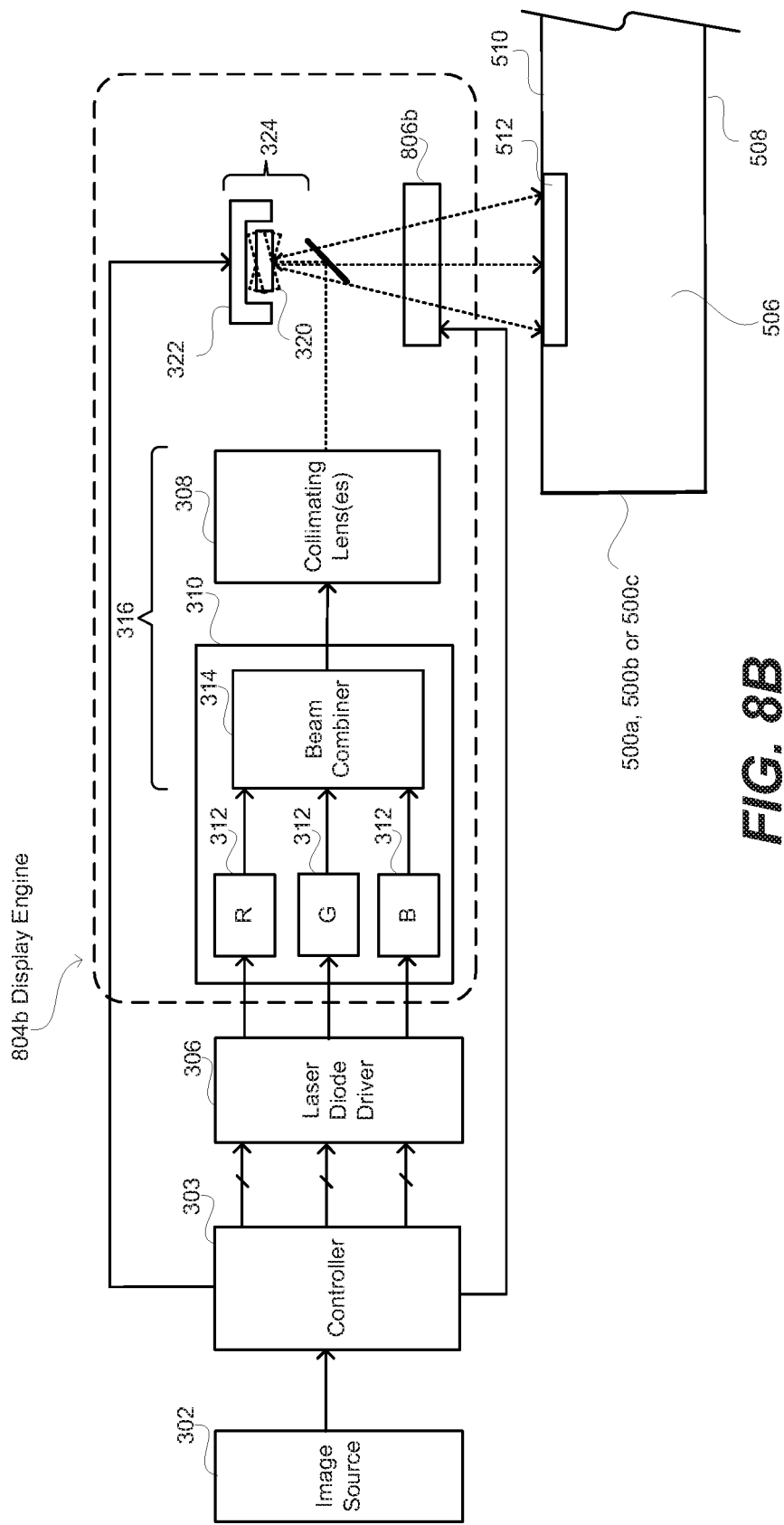

FIGS. 8A and 8B, respectively, illustrate exemplary display engines 804a and 804b that includes adaptive optics that are controlled to compensate for aberrations that vary over a FOV (i.e., differ for different field angles) associated with the light corresponding to the image that is out-coupled by an output-grating (e.g., 516) of the curved optical waveguide (e.g., 500a, 500b or 500c). In FIGS. 8A and 8B, a small section of a planar portion of a curved optical waveguide (e.g., 500a, 500b or 500c) and its input-grating 512 are shown. The curved portion of the optical wave guide and its output-grating 516 would be to the right (off the page), and thus are not shown. However, it should be understood that the waveguide shown in FIGS. 8A and 8B includes a curved portion, which may, e.g., resemble the curved portions 505 shown in and described above with reference to FIGS. 5A, 5B and 5C.

The display engines 804a and 804b shown, respectively, in FIGS. 8A and 8B include many of the same components shown in and described above with reference to FIG. 3. Where the elements are labeled the same in FIGS. 8A and 8B as they were in FIG. 3, it should be understood that these elements function in the same or similar manners to the elements as they were described above with reference to FIG. 3, unless stated otherwise. As was described above with reference to FIG. 3, the image source 302, the controller 303 and the LDD 306 are shown as being outside the dashed blocks labeled 804a and 804b, and thus, are shown as being outside the display engines 804a and 804b. Alternatively, one or more of the image source 302, the controller 303 and/or the LDD 306 can be considered part of the display engine 804a or 804b, as this would just be a matter of nomenclature. These elements also function in the same or similar manners to the elements as they were described above with reference to FIG. 3, unless stated otherwise.

A difference between the display engine 804a shown in FIG. 8A, and the display engine 304 shown in FIG. 3, is that the display engine 804a is shown as including an adaptive optical element 806a that is positioned within an optical pathway between the optical subsystem 316 (that produces a collimated beam of light from the light emitted by the LDs 312) and the scanning mirror subsystem 324. A difference between the display engine 804b shown in FIG. 8B, and the display engine 304 shown in FIG. 3, is that the display engine 804b is shown as including an adaptive optical element 806b positioned within an optical pathway between the scanning mirror subsystem 324 and the input-grating 512 of the curved optical waveguide (e.g., 500a, 500b, or 500c). The adaptive optical elements 806a and/or 806b can be referred to herein collectively as the adaptive optical elements 806, or individually as an adaptive optical element 806.

While the display engines 804a and 804b shown in FIGS. 8A and 8B are each shown as including only one adaptive optical element 806, in a further embodiment, a display engine includes two adaptive optical elements, one of which is positioned within an optical pathway between the optical subsystem 316 (that produces a collimated beam of light from the light emitted by the LDs 312) and the scanning mirror subsystem 324, and another one of which is positioned within an optical pathway between the scanning mirror subsystem 324 and the input-grating 512 of the curved optical waveguide (e.g., 500a, 500b, or 500c). The display engines 804a and 804b can be referred to collectively as the display engines 804, or individually as a display engine 804. Unless stated otherwise, it will be assumed for simplicity that a display engine 804 includes one adaptive optical element 806, which is either positioned within an optical pathway between the optical subsystem 316 and the scanning mirror subsystem 324, or within an optical pathway between the scanning mirror subsystem 324 and the input-grating 512 of the curved optical waveguide.

In FIGS. 8A and 8B, it is assumed that each of the adaptive optical elements 806 is a deformable lens, since light is shown as passing through the adaptive optical elements 806. Such a deformable lens can be, e.g., a tunable liquid lens, but is not limited thereto. Also, it should be understood that one or both of the adaptive optical elements 806a and 806b can be replaced with a deformable mirror by repositioning the elements relative to another another.

Each adaptive optical element 806 receives a control signal from the controller 303, or from some other controller, which control signal is used to controllably deform the lens (or mirror) of the adaptive optical element 806. Such an adaptive optical element 806 can be controlled in real time in order to correct for aberrations that differ for different field angles in real time. More specifically, aberrations are determined for each of the possible field angles produced using the display engine 804 and the adaptive optics are used to apply an inverse of the aberrations, to thereby correct for the aberrations. Explained another way, aberrations are determined for each pixel position within a FOV, and the adaptive optics are used to apply an inverse of the aberrations for each pixel position within the FOV, to thereby adaptively correct for the aberrations.

The aberrations (which are corrected for) can be determined by either measuring or calculating the aberrations that occur within the eye-box that is proximate the output-coupler (e.g., 516) of a curved waveguide (e.g., 500a, 500b, or 500c). The eye-box, which is dependent on an exit pupil size and an eye relief distance, is a volume of space within which the image formed by the display engine 804 is effectively viewable, after light corresponding to the image has been diffractively coupled into an optical waveguide by an input-grating and thereafter diffractively output-coupled by an output-grating. The types of aberrations that are determined can include spherical aberrations, defocus, coma, and astigmatism, or subsets thereof, but are not limited thereto.

In accordance certain embodiments, aberrations (e.g., including spherical aberrations, defocus, coma, and/or astigmatism) are determined (measured or calculated) for a spatially diverse subset of the total pixel positions (also known as field angles), and then the aberrations for the remaining pixel positions are calculated using interpolation. Various different types of interpolation techniques, such as, but not limited to, polynomial interpolation or spline interpolation, can be used to perform the aforementioned interpolation. Aberrations can be calculated using off the shelf software, such as MATLAB™ available from MathWorks, headquartered in Natick, Mass., USA, and/or FRED Optical Engineering Software™ available from Photon Engineering, LLC, headquartered in Tucson, Ariz., USA. Once aberrations are determined, the inverses thereof can be calculated, e.g., by the controller 303, some other controller, or a some other subsystem within or external to the system and thereafter uploaded to memory of the system that is accessible by the controller 303, or some other controller. More specifically, an aberration function can be determined for each pixel position, in a spatially diverse subset of the total pixel positions (also known as field angles), and then the inverse of the aberrations associated with each of the pixel positions can be determined by determining the inverse function of the aberration function.

In accordance with certain embodiments, aberrations, or the inverse thereof, can be measured using a sensor positioned within an eye box proximate an output-grating (e.g., 516) of a curved optical waveguide (e.g., 500a, 500b or 500c), wherein the sensor essentially simulates a user's eye. Such a sensor can include, e.g., a lens and a charge-coupled device (CCD) or complementary metal-oxide-semiconductor (CMOS) focal plane array that includes an array of light sensing pixels at a focal plane of the lens. For each pixel position, when aberrations are large a spot size detected by the sensor will be very large. By contrast, when aberrations are substantially minimized, the spot size detected by the sensor will be very small. Accordingly, coefficients associated with an aberration function that provides for a substantially minimal spot size can be determined using the sensor in a closed loop feedback system. Beneficially, coefficients for aberrations (or the inverse thereof) can be determined separately for the different types of aberrations, making it easier to calculate or measure the aberrations (or the inverse thereof).

After aberrations (or the inverse thereof) have been determined, an adaptive optical element 806 of a display engine 804 can be used to correct for the aberrations by including an inverse of the aberrations in an input-pupil of image bearing light, before the light is diffractively in-coupled by an input-grating (e.g., 512) into a bulk substrate of a curved optical waveguide (e.g., 500a, 500b or 500c).

In summary, when using a display system including scanning mirror subsystem to produce light corresponding to an image (which can also be referred to as an input-pupil of image bearing light), the aberrations are field angle dependent. In accordance with certain embodiments of the present technology described herein, the aberrations that are field angle dependent can be corrected by producing the input-pupil of image bearing light using a scanning mirror subsystem where a static laser beam hits one or more scanning mirrors whose movement produce the image pixels time sequentially. Depending upon implementation, before or after the laser beam is incident on the scanning mirror(s), the laser beam is incident on an adaptive optical element (e.g., a deformable lens or mirror) that is modulated together with the scanning mirror(s) to enable aberration corrections that change over the field-of-view. In this manner, corrections for the aberrations are performed thereby enabling a good image to be obtained using a curved waveguide. The phrases "correcting for aberrations," "correcting aberrations," and "compensation for aberrations," as used herein, are used interchangeably.

The adaptive optical element (e.g., 806a or 806b) can be designed and simulated using off the shelf or custom software. Exemplary off the shelf software that can be used to design and/or simulate the optical effects of an adaptive optical element includes OpticStudio™ software available from Zemax, LLC, headquartered in Kirkland, Wash.

In the above description, the display engines 804a and 804b, were described as outputting red, green and blue light of a pupil corresponding to an image, and the waveguides 500 were described as transferring the red, green and blue light from the input-gratings 512 to the output-gratings 516 of the various waveguides 500, and more generally, from an input-pupil to an output-pupil. However, it is also within the scope of the present technology that the light output by the display engines include alternative colors, such as, but not limited to, cyan, magenta and yellow, in which cases the input-gratings 512 and output-gratings 516 (and intermediate-components, if present) would be designed for such alternative wavelength ranges. It is also within the scope of the present technology that more than three colors of light be output by a display engine, e.g., a display engine can output red, green, blue and yellow light of a pupil corresponding to an image. In this latter case, an additional waveguide can be used to guide the yellow light, or the yellow light can be guided within one of the waveguides that also guides one of the other colors. Other variations are possible and within the scope of the present technology.

In FIGS. 8A and 8B, a section of only one curved waveguide 500 is shown for simplicity. However, where the display engine outputs light of three different colors, such as red, green and blue light, multiple curved waveguides 500 would likely be used, stacked one above the other (potentially with spacers therebetween), which each waveguide being used to transfer light of one (or two) of the colors from its respective input-grating to its respective output-grating. Each waveguide can also include one or more intermediate-component, and the intermediate-component(s) and the output-grating can be used to preform pupil expansion.

In accordance with certain embodiments of the present technology, a display engine can include a holographic display or image former instead of a scanning mirror subsystem. In such embodiments, aberrations could instead by corrected using the holographic display itself, by using the holographic display to produce an input-pupil of image bearing light having the inverse aberrations included, such that after the light is diffractively in-coupled by an input-grating (e.g., 512) into a curved optical waveguide (e.g., 500a, 500b or 500c) and travels at least in part by way of TIR to the output-grating, the light corresponding to the image that is diffractively out-coupled by the output-grating (e.g., 516) is viewable within an eye box substantially without the aberrations.

Figure 9:
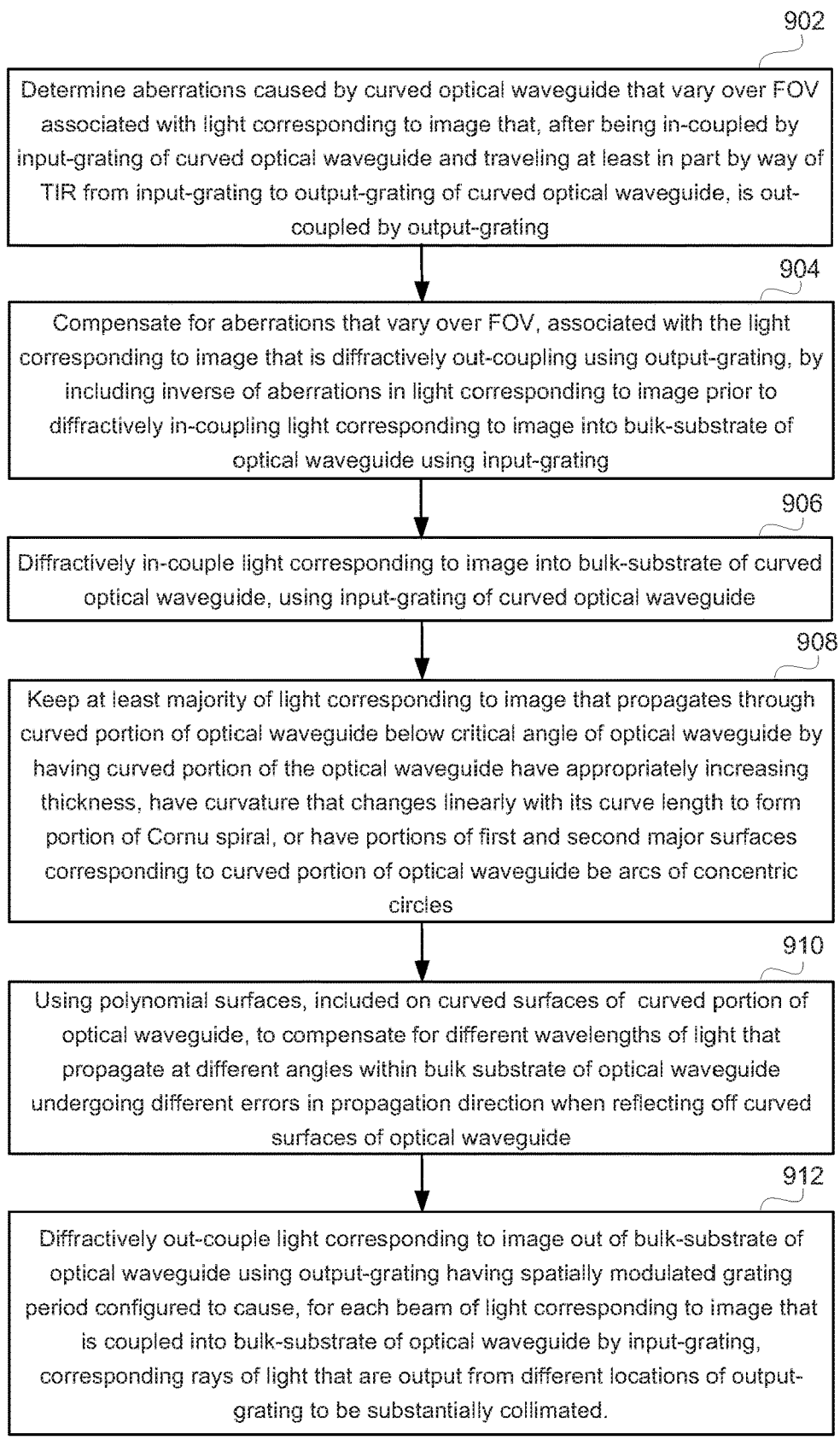
FIG. 9 is a high level flow diagram that is used to summarize methods according to various embodiments of the present technology.

The high level flow diagram of FIG. 9 will now be used to summarize methods according to various embodiments of the present technology. Referring to FIG. 9, step 902 involves determining aberrations caused by a curved optical waveguide that vary over the FOV associated with the light corresponding to the image that, after being in-coupled by an input-grating of the curved optical waveguide and traveling at least in part by way of TIR from the input-grating to an output-grating of the curved optical waveguide, is out-coupled by the output-grating of the optical waveguide. As explained above, the determining of the aberrations can be performed using measurements or calculations, or a combination thereof. The determined aberrations can include spherical aberrations, defocus, coma and/or astigmatism, but are not limited thereto. As explained above, a curved optical waveguide, as the term is used herein, includes at least a portion that is curved along a longitudinal length of the optical waveguide, and can also include a portion that is planar. For example, referring briefly back to FIGS. 5A, 5B and 5C discussed above, the input-grating (e.g., 512) can be located in the planar portion (e.g., 503) of the optical waveguide (e.g., 500a, 500b or 500c), and at least a portion of the output-grating (e.g., 516) can be located in the curved portion (e.g., 505) of the optical waveguide (e.g., 500a, 500b or 500c).

Referring again to FIG. 9, step 904 involves compensating for the aberrations that vary over the FOV, associated with the light corresponding to the image that is diffractively out-coupling using the output-grating, by including an inverse of the aberrations in the light corresponding to the image prior to diffractively in-coupling the light corresponding to the image into the bulk-substrate of the optical waveguide using the input-grating of the optical waveguide. For example, referring briefly back to FIGS. 8A and 8B discussed above, step 904 can be performed by appropriately controlling the adaptive optical element 806a in FIG. 8A, or the adaptive optical element 806b in FIG. 8B. Alternatively, step 904 can be performed by a same holographic display that is used to produce the light corresponding to the image, as was described above.

Referring again to FIG. 9, step 906 involves diffractively in-coupling light corresponding to an image into the bulk-substrate of the optical waveguide, using the input-grating of the optical waveguide. Such an image can include a plurality of image pixels each of which includes light corresponding thereto. Step 906 can be performed by an input-grating (e.g., 512) of a curved optical waveguide (e.g., 500a, 500b or 500c). As noted above, the light corresponding to an image, before it is in-coupled into an optical waveguide by an input-grating, can also be referred to as an input-pupil of image bearing light. Similarly, the light corresponding to the image, after it is out-coupled from an optical waveguide by an output-grating, can also be referred to as an output-pupil of image bearing light.

Step 908 involves keeping at least a majority (and preferably substantially all) of the light corresponding to the image that propagates through the curved portion of the optical waveguide below a critical angle of the optical waveguide by having the curved portion of the optical waveguide have appropriate characteristics. The appropriate characteristics can be that a thickness of the curved portion of the optical waveguide increases longitudinally in a direction that light propagates within the optical waveguide towards the output-grating. Alternatively, or additionally, the curved portion of the optical waveguide can have a curvature that changes linearly with its curve length to form a portion of a Cornu spiral. Alternatively, portions of the first and second major surfaces corresponding to the curved portion of the optical waveguide can respectively be first and second arcs of first and second concentric circles. Examples of such embodiments were described above with reference to FIGS. 5A, 5B and 5C.

Step 910 involves using polynomial surfaces, that are included on curved surfaces of the curved portion of the optical waveguide, to compensate for different wavelengths of light that propagate at different angles within the bulk substrate of the optical waveguide undergoing different errors in a propagation direction when reflecting off the curved surfaces of the optical waveguide. Step 910 can be performed to mitigate and preferably minimize lateral color errors and distortion.

Step 912 involves diffractively out-coupling light corresponding to the image out of the bulk-substrate of the optical waveguide, using the output-grating of the optical waveguide, after the light travels through the optical waveguide from the input-grating to the output-grating at least in part by way of TIR. Step 912 can be performed by an output-grating (e.g., 516) of a curved optical waveguide (e.g., 500a, 500b or 500c). In accordance with certain embodiments of the present technology, the output-grating has a grating period that is spatially modulated, and step 912 is performed using the output-grating having the spatially modulated grating period configured to cause, for each beam of light corresponding to image that is coupled into bulk-substrate of optical waveguide by input-grating, corresponding rays of light that are output from different locations of the output-grating to be substantially collimated. Exemplary polynomial functions that correspond to the spatially modulated grating period of the output-grating were described above with reference to FIG. 6.

Additional details of the steps summarized with reference to FIG. 9 can be appreciated from the above description of the previously described FIG.

Certain embodiments of the present technology relate to an apparatus including optical waveguide, wherein the optical waveguide includes a bulk-substrate, an input-grating and an output-grating. The bulk-substrate of the optical waveguide includes a first major surface and a second major surface opposite the first major surface. At least a portion of each of the first and second major surfaces of the optical waveguide is curved, and thus, at least a portion of the optical waveguide is curved along a longitudinal length of the optical waveguide. The input-grating of the optical waveguide is configured to couple light corresponding to an image into the bulk-substrate of the optical waveguide. The output-grating of the optical waveguide is configured to couple, out of the bulk-substrate of the optical waveguide, light corresponding to the image that travels through the optical waveguide from the input-grating to the output-grating at least in part by way of total internal reflection (TIR). In accordance with certain embodiments, the output-grating of the optical waveguide includes a spatially modulated grating period configured to cause, for each beam of light corresponding to the image that is coupled into the bulk-substrate of the optical waveguide by the input-grating, corresponding rays of light that are output from different locations of the output-grating to be substantially collimated. In accordance with certain embodiments, the grating period of the output-grating is spatially modulated in accordance with a polynomial function.

The above described apparatus can also include a display engine configured to produce the light corresponding to the image that is coupled into the bulk substrate of the optical waveguide by the input-grating. In accordance with certain embodiments, the display engine includes adaptive optics and a controller configured to control the adaptive optics to compensate for aberrations that vary over a FOV associated with the light corresponding to the image that is out-coupled by the output-grating of the optical waveguide. The aberrations that are compensated for by the adaptive optics of the display engine can include spherical aberrations, defocus, coma and/or astigmatism.

The display engine can include one or more light emitting elements each of which is configured to emit light in response to being driven, an optical subsystem, and a scanning mirror subsystem. The optical subsystem is configured to produce a collimated beam of light from the light emitted by the one or more light emitting elements. The scanning mirror subsystem includes one or more scanning mirrors configured to reflect the collimated beam of light produced by the optical subsystem and controlled to produce the light corresponding to the image. In accordance with certain embodiments, the adaptive optics of the display engine includes one or more adaptive optical elements, wherein at least one of the one or more adaptive optical elements is positioned within an optical pathway between the optical subsystem and the scanning mirror subsystem, or within an optical pathway between the scanning mirror subsystem and the input-grating of the optical waveguide. Each of the adaptive optical element(s) can be a deformable mirror or a deformable lens. The aberrations, that vary over the FOV associated with the light corresponding to the image that is out-coupled by the output-grating of the optical waveguide, can be determined using calculations and/or measurements. In accordance with certain embodiments, the aberrations are compensated for by controlling the adaptive optics of the display engine to include an inverse of the aberrations in the light corresponding to the image before the light corresponding to the image is coupled into the bulk-substrate of the optical waveguide by the input-grating.

In certain embodiments, a holographic display is used to produce the light corresponding to the image that is coupled into the bulk-substrate of the optical waveguide by the input-grating. In such embodiments, the holographic display can be controlled to include an inverse of aberrations in the light corresponding to the image that are caused by the optical waveguide, before the light corresponding to the image is coupled into the bulk-substrate of the optical waveguide by the input-grating, to thereby compensate for the aberrations that vary over a FOV associated with the light corresponding to the image that is out-coupled by the output-grating of the optical waveguide. The aberrations that are compensated for by the holographic display can include spherical aberrations, defocus, coma and/or astigmatism, but are not limited thereto.

In accordance with certain embodiments, in order to ensure that propagation angles of at least a majority of the light corresponding the image that propagates through the portion of the optical waveguide that is curved do not fall below a critical angle of the optical waveguide, and thus, is not out-coupled before reaching distal portions of the output-grating, the portion of the optical waveguide that is curved has certain characteristics. In one embodiment, a thickness, between portions of the first and second major surfaces that corresponding to the portion of the optical waveguide that is curved, increases in a longitudinal direction that light propagates within the optical waveguide towards the output-grating. Alternatively, or additionally, the portion of the optical waveguide that is curved has a curvature that changes linearly with its curve length to form a portion of a Cornu spiral. Alternatively, portions of the first and second major surfaces that corresponding to the portion of the optical waveguide that is curved comprise, respectively, first and second arcs of first and second concentric circles.

In accordance with certain embodiments, portions of the first and second major surfaces that corresponding to the portion of the optical waveguide that is curved, in addition to being curved surfaces include polynomial surfaces that compensate for different wavelengths of light that propagate at different angles within the bulk-substrate of the optical waveguide undergoing different errors in a propagation direction when reflecting off a said curved surface of the waveguide.

Certain embodiments of the present technology related to methods for use with a near eye or heads up display system that includes an optical waveguide including a bulk-substrate, an input-grating and an output-grating, wherein the bulk-substrate of the optical waveguide includes a first major surface and a second major surface opposite the first major surface, and wherein at least a portion of the optical waveguide is curved along its longitudinal length. Such a method can include diffractively in-coupling light corresponding to an image into the bulk-substrate of the optical waveguide using the input-grating of the optical waveguide. The method can also include diffractively out-coupling light corresponding to the image out of the bulk-substrate of the optical waveguide, using the output-grating of the optical waveguide, after the light travels through the optical waveguide from the input-grating to the output-grating at least in part by way of TI R. In certain embodiments, the diffractively out-coupling is performed using a spatially modulated grating period of the output-grating that causes, for each beam of light corresponding to the image that is coupled into bulk-substrate of optical waveguide by input-grating, corresponding rays of light that are output from different locations of the output-grating to be substantially collimated.

A method can also include compensating for aberrations that vary over a FOV associated with the light corresponding to the image that is diffractively out-coupling using the output-grating, by including an inverse of the aberrations in the light corresponding to the image prior to the diffractively in-coupling the light corresponding to the image into the bulk-substrate of the optical waveguide using the input-grating of the optical waveguide. The including the inverse of the aberrations can be performed using at least one adaptive optical element, e.g., a deformable lens and/or a deformable mirror. In other embodiments, the including the inverse of the aberrations is performed using a same holographic display that is used to produce the light corresponding to the image.

A method can also include keeping at least a majority of the light corresponding to the image that propagates through the curved portion of the optical waveguide above a critical angle of the optical waveguide by having the curved portion of the optical waveguide have at least one of the following characteristics: a thickness that increases longitudinally in a direction that light propagates within the optical waveguide towards the output-grating; a curvature that changes linearly with its curve length to form a portion of a Cornu spiral; or portions of the first and second major surfaces corresponding to the curved portion of the optical waveguide comprising, respectively, first and second arcs of first and second concentric circles.

A method can further include using polynomial surfaces, that are included on curved surfaces of the curved portion of an optical waveguide, to compensate for different wavelengths of light that propagate at different angles within the bulk substrate of the optical waveguide undergoing different errors in a propagation direction when reflecting off the curved surfaces of the optical waveguide.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. An apparatus, comprising:
an optical waveguide including a bulk-substrate, an input-grating and an output-grating;
the bulk-substrate of the optical waveguide including a first major surface and a second major surface opposite the first major surface;
at least a portion of each of the first and second major surfaces of the optical waveguide forming a curved portion of the optical waveguide that is curved about an axis perpendicular to a longitudinal length of the optical waveguide and to a direction of a thickness of the optical waveguide;
the input-grating of the optical waveguide configured to couple light corresponding to an image into the bulk-substrate of the optical waveguide;
the output-grating of the optical waveguide configured to couple, out of the bulk-substrate of the optical waveguide, light corresponding to the image that travels through the optical waveguide from the input-grating along the longitudinal length of the optical waveguide to the output-grating at least in part by way of total internal reflection (TIR), wherein at least a portion of the output-grating is positioned within the curved portion of the optical waveguide, and wherein the curved portion of the optical waveguide has a curvature relative to a position of the output-grating configured to mitigate inadvertent output-coupling of the light; and
the output-grating of the optical waveguide including a spatially modulated grating period configured to cause, for a beam of light corresponding to the image that is coupled into the bulk-substrate of the optical waveguide by the input-grating, corresponding rays of light that are output from different locations of the output-grating to be substantially collimated.

2. The apparatus of claim 1, further comprising:
a display engine configured to produce the light corresponding to the image that is coupled into the bulk-substrate of the optical waveguide by the input-grating;
the display engine including adaptive optics; and
a controller configured to control the adaptive optics to compensate for aberrations that vary over a field-of-view (FOV) associated with the light corresponding to the image that is out-coupled by the output-grating of the optical waveguide.

3. The apparatus of claim 2, wherein the aberrations that are compensated for by the adaptive optics of the display engine include one or more following types of aberrations:
   spherical aberrations;
   defocus;
   coma; or
   astigmatism.

4. The apparatus of claim 2, wherein the display engine further comprises:
   one or more light emitting elements each of which is configured to emit light in response to being driven;
   an optical subsystem configured to produce a collimated beam of light from the light emitted by the one or more light emitting elements; and
   a scanning mirror subsystem including one or more scanning mirrors configured to reflect the collimated beam of light produced by the optical subsystem and controlled to produce the light corresponding to the image;
   wherein the adaptive optics of the display engine includes one or more adaptive optical elements; and
   wherein at least one of the one or more adaptive optical elements is positioned within an optical pathway between the optical subsystem and the scanning mirror subsystem, or within an optical pathway between the scanning mirror subsystem and the input-grating of the optical waveguide.

5. The apparatus of claim 4, wherein each of the one or more adaptive optical elements comprises one of a deformable mirror or a deformable lens.

6. The apparatus of claim 2, wherein:
   the aberrations, that vary over the FOV associated with the light corresponding to the image that is out-coupled by the output-grating of the optical waveguide, are determined using at least one of calculations or measurements; and
   the aberrations are compensated for by controlling the adaptive optics of the display engine to include an inverse of the aberrations in the light corresponding to the image before the light corresponding to the image is coupled into the bulk-substrate of the optical waveguide by the input-grating.

7. The apparatus of claim 1, further comprising:
   a holographic display that produces the light corresponding to the image;
   wherein the holographic display is controlled to include an inverse of aberrations in the light corresponding to the image that are caused by the optical waveguide, before the light corresponding to the image is coupled into the bulk-substrate of the optical waveguide by the input-grating, to thereby compensate for the aberrations that vary over a field-of-view (FOV) associated with the light corresponding to the image that is out-coupled by the output-grating of the optical waveguide; and
   wherein the aberrations that are compensated for by the holographic display include one or more following types of aberrations: spherical aberrations; defocus; coma; or astigmatism.

8. The apparatus of claim 1, wherein in order to ensure that propagation angles of at least a majority of the light corresponding the image that propagates through the portion of the optical waveguide that is curved do not fall below a critical angle of the optical waveguide, and thus, is not out-coupled before reaching distal portions of the output-grating, the portion of the optical waveguide that is curved has at least one or more following characteristics:
   a thickness, between portions of the first and second major surfaces that corresponding to the portion of the optical waveguide that is curved, that increases in a longitudinal direction that light propagates within the optical waveguide towards the output-grating;
   the portion of the optical waveguide that is curved has a curvature that changes linearly with its curve length to form a portion of a Cornu spiral; or
   portions of the first and second major surfaces that corresponding to the portion of the optical waveguide that is curved comprise, respectively, first and second arcs of first and second concentric circles.

9. The apparatus of claim 1, wherein portions of the first and second major surfaces that corresponding to the portion of the optical waveguide that is curved, in addition to being curved surfaces comprise polynomial surfaces that compensate for different wavelengths of light that propagate at different angles within the bulk-substrate of the optical waveguide undergoing different errors in a propagation direction when reflecting off a said curved surface of the optical waveguide.

10. A method for use with a near eye or heads up display system that includes an optical waveguide including a bulk-substrate, an input-grating and an output-grating, the bulk-substrate of the optical waveguide including a first major surface and a second major surface opposite the first major surface, wherein at least a portion of the optical waveguide forms a curved portion that is curved about an axis perpendicular to a longitudinal length of the optical waveguide and to a direction of a thickness of the optical waveguide, the method comprising:
   diffractively in-coupling light corresponding to an image into the bulk-substrate of the optical waveguide, using the input-grating of the optical waveguide;
   diffractively out-coupling light corresponding to the image out of the bulk-substrate of the optical waveguide, using the output-grating of the optical waveguide, after the light corresponding to the image travels through the optical waveguide from the input-grating along the longitudinal length of the optical waveguide to the output-grating at least in part by way of total internal reflection (TIR), wherein at least a portion of the output-grating is positioned within the curved portion of the optical waveguide, and wherein the curved portion of the optical waveguide has a curvature relative to a position of the output-grating configured to mitigate inadvertent output-coupling of the light; and
   the diffractively out-coupling performed using a spatially modulated grating period of the output-grating that causes, for a beam of the light corresponding to the image that is coupled into bulk-substrate of optical waveguide by input-grating, corresponding rays of light that are output from different locations of the output-grating to be substantially collimated.

11. The method of claim 10, further comprising:
   compensating for aberrations that vary over a field-of-view (FOV) associated with the light corresponding to the image that is diffractively out-coupling using the output-grating, by including an inverse of the aberrations in the light corresponding to the image prior to the diffractively in-coupling the light corresponding to the image into the bulk-substrate of the optical waveguide using the input-grating of the optical waveguide.

12. The method of claim 11, wherein the including the inverse of the aberrations is performed using at least one adaptive optical element.

13. The method of claim 11, wherein the including the inverse of the aberrations is performed using a same holographic display that is used to produce the light corresponding to the image.

14. The method of claim 11, further comprising:
keeping at least a majority of the light corresponding to the image that propagates through the curved portion of the optical waveguide below a critical angle of the optical waveguide by having the curved portion of the optical waveguide have at least one of the or more following characteristics:
  a thickness that increases longitudinally in a direction that light propagates within the optical waveguide towards the output-grating;
  a curvature that changes linearly with its curve length to form a portion of a Cornu spiral; or
  portions of the first and second major surfaces corresponding to the curved portion of the optical waveguide comprising, respectively, first and second arcs of first and second concentric circles.

15. The method of claim 11, further comprising:
using polynomial surfaces, that are included on curved surfaces of the curved portion of the optical waveguide, to compensate for different wavelengths of light that propagate at different angles within the bulk-substrate of the optical waveguide undergoing different errors in a propagation direction when reflecting off the curved surfaces of the optical waveguide.

16. An near eye or heads up display system, comprising:
a display engine configured to produce light corresponding to an image;
an optical waveguide including a bulk-substrate, an input-grating and an output-grating;
the bulk-substrate of the optical waveguide including a first major surface and a second major surface opposite the first major surface;
at least a portion of each of the first and second major surfaces of the optical waveguide forming a curved portion of the optical waveguide that is curved about an axis perpendicular to a longitudinal length of the optical waveguide and to a direction of a thickness of the optical waveguide;
the input-grating of the optical waveguide configured to couple the light corresponding to the image into the bulk-substrate of the optical waveguide;
the output-grating of the optical waveguide configured to couple, out of the bulk-substrate of the optical waveguide, light corresponding to the image that travels through the optical waveguide from the input-grating along the longitudinal length of the optical waveguide to the output-grating at least in part by way of total internal reflection (TIR), wherein at least a portion of the output-grating is positioned within the curved portion of the optical waveguide, and wherein the curved portion of the optical waveguide has a curvature relative to a position of the output-grating configured to mitigate inadvertent output-coupling of the light; and
the display engine including one or more adaptive optical elements that is/are configured to correct for aberrations that vary over a field-of-view (FOV) associated with the light corresponding to the image that is out-coupled by the output-grating of the optical waveguide.

17. The system of claim 16, wherein:
the output-grating of the optical waveguide includes a grating period that varies in accordance with a polynomial function and is configured to cause, for each beam of light corresponding to the image that is coupled into the bulk-substrate of the optical waveguide by the input-grating, corresponding rays of light that are output from different locations of the output-grating to be substantially collimated.

18. The system of claim 17, wherein in order to ensure that propagation angles of at least a majority of the light corresponding the image that propagates through the portion of the optical waveguide that is curved do not fall below a critical angle of the optical waveguide, and thus, is not out-coupled before reaching distal portions of the output-grating, the portion of the optical waveguide that is curved has at least one or more following characteristics:
  a thickness, between portions of the first and second major surfaces that corresponding to the portion of the optical waveguide that is curved, that increases in a longitudinal direction that light propagates within the optical waveguide towards the output-grating;
  the portion of the optical waveguide that is curved has a curvature that changes linearly with its curve length to form a portion of a Cornu spiral; or
  portions of the first and second major surfaces that corresponding to the portion of the optical waveguide that is curved comprise, respectively, first and second arcs of first and second concentric circles.

19. The system of claim 16, wherein the display engine further comprises:
a scanning mirror subsystem including one or more scanning mirrors configured to reflect a collimated beam of light and controlled to produce the light corresponding to the image;
wherein the one or more adaptive optical elements of the display engine interact with the light corresponding to the image produced using the scanning mirror subsystem, to thereby include an inverse of the aberrations, before the light corresponding to the image is coupled into the bulk-substrate of the optical waveguide by the input-grating.

20. The system of claim 19, wherein:
each of the one or more adaptive optical elements comprises one of a deformable mirror or a deformable lens; and
the aberrations that are compensated for by the one or more adaptive optical elements include one or more following types of aberrations: spherical aberrations; defocus; coma; or astigmatism.

* * * * *